(12) United States Patent
Chamberland et al.

(10) Patent No.: US 11,449,783 B2
(45) Date of Patent: Sep. 20, 2022

(54) TRIVALENT LATTICE SCHEME TO IDENTIFY FLAG QUBIT OUTCOMES

(71) Applicant: International Business Machines Corporation, Armonk, NY (US)

(72) Inventors: Christopher Chamberland, Yorktown Heights, NY (US); Theodore James Yoder, White Plains, NY (US); Andrew W. Cross, Yorktown Heights, NY (US); Guanyu Zhu, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 502 days.

(21) Appl. No.: 16/661,434

(22) Filed: Oct. 23, 2019

(65) Prior Publication Data

US 2021/0125094 A1 Apr. 29, 2021

(51) Int. Cl.
*G06N 10/00* (2022.01)
*G06F 16/901* (2019.01)
*G06F 17/16* (2006.01)

(52) U.S. Cl.
CPC ......... *G06N 10/00* (2019.01); *G06F 16/9024* (2019.01); *G06F 17/16* (2013.01)

(58) Field of Classification Search
CPC ...... G06N 10/00; G06F 16/9024; G06F 17/16
See application file for complete search history.

(56) References Cited

U.S. PATENT DOCUMENTS 10,248,491 B1    4/2019   Zeng et al.
2021/0125096 A1*  4/2021  Puri ....................... G06N 10/00

OTHER PUBLICATIONS

Mell, Peter, et al. "The NIST Definition of Cloud Computing." National Institute of Standards and Technology. Sep. 2011. 7 pages.
Chamberland, et al. "Topological and subsystem codes on low-degree graphs with flag qubits." arXiv:1907.09528v1 [quant-ph] Jul. 22, 2019. 20 pages.
Rigetti, et al. "Fully microwave-tunable universal gates in superconducting qubits with linear couplings and fixed transition frequencies." Phys Rev. B 81, 134507—Published Apr. 5, 2010. 7 pages.

(Continued)

*Primary Examiner* — Curtis B Odom
(74) *Attorney, Agent, or Firm* — Amin, Turocy & Watson, LLP

(57) ABSTRACT

Techniques regarding encoding a quantum circuit to a trivalent lattice scheme to identify flag qubit outcomes are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a graph component that can encode a quantum circuit to a trivalent lattice that maps an ancilla qubit to a plurality of data qubits via a plurality of flag qubits based on a connectivity scheme of the quantum circuit.

25 Claims, 21 Drawing Sheets
(10 of 21 Drawing Sheet(s) Filed in Color)

(56) References Cited

OTHER PUBLICATIONS

Chow, et al. "A simple all-microwave entangling gate for fixed-frequency superconducting qubits." Phys. Rev. Lett. 107, 080502 (2011). arXiv:1106.0553v1 [quant-ph] Jun. 3, 2011. 5 pages.

Chamberland, et al. "Flag fault-tolerant error correction with arbitrary distance codes." arXiv:1708.02246v3 [quant-ph] Jan. 31, 2018. 29 pages.

Maskara, et al. "Advantages of versatile neural-network decoding for topological codes." Phys. Rev. A 99, 052351—Published May 30, 2019. 13 pages.

Wang, et al. "Surface code quantum computing with error rates over 1%." Phys. Rev. A 83, 020302(R)—Published Feb. 18, 2011. 4 pages.

Fowler, et al. "Surface codes: Towards practical large-scale quantum computation." Phys. Rev. A 86, 032324—Published Sep. 18, 2012. 48 pages.

Bombin "Single-shot fault-tolerant quantum error correction." arXiv:1404.5504v5 [quant-ph] May 12, 2016. 26 pages.

Bombin "Gauge Color Codes: Optimal Transversal Gates and Gauge Fixing in Topological Stabilizer Codes." arXiv:1311.0879v6 [quant-ph] Aug. 6, 2015. 10 pages.

Kubica, et al. "Unfolding the color code." arXiv:1503.02065v1 [quant-ph] Mar. 6, 2015. 46 pages.

International search report and written opinion received for PCT aplication No. PCT/EP2020/079632 dated Feb. 3, 2021, 8 pages.

Baireuther et al.," Neural network decoder for topological color codes with circuit level noise", arxiv .org, Cornell University Library, Apr. 9, 2018, 10 pages.

\* cited by examiner

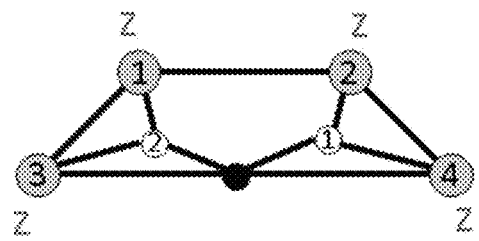 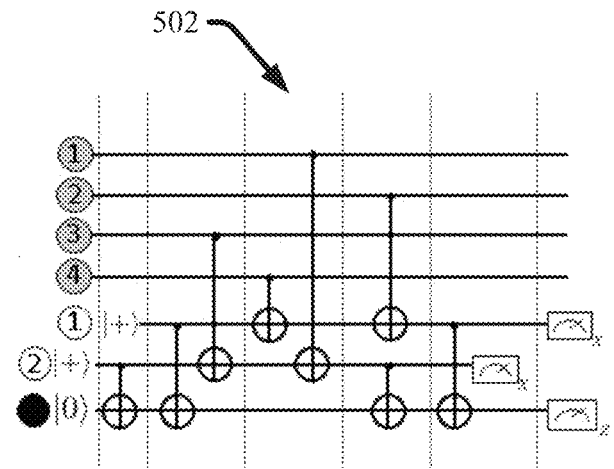
FIG. 5A
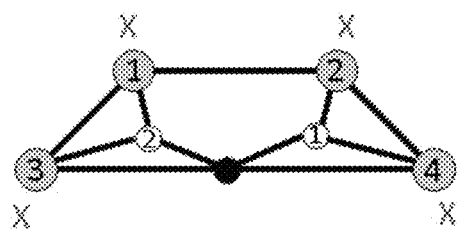 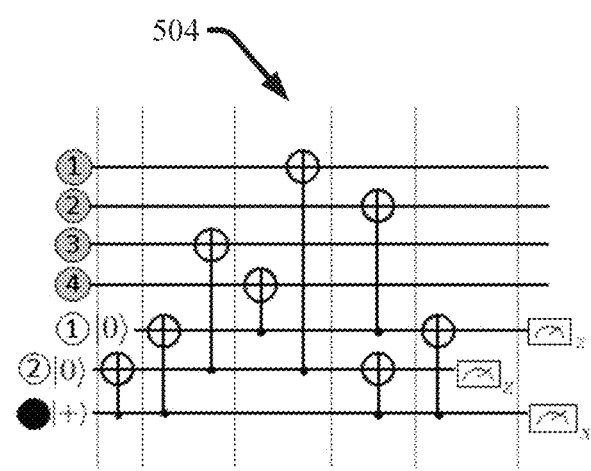
FIG. 5B

① $|+\rangle \longrightarrow \{Z_1, Z_1Z_2, I\}$

② $|+\rangle \longrightarrow \{Z_4, Z_3Z_4, I\}$

③ $|+\rangle \longrightarrow \{Z_6, Z_5Z_6, I\}$

① $|+\rangle$ ③ $|+\rangle \longrightarrow \{Z_3Z_4\}$

① $|+\rangle$ ② $|+\rangle \longrightarrow \{I\}$

① $|+\rangle$ ② $|+\rangle$ ③ $|+\rangle \longrightarrow \{I\}$

FIG. 9A

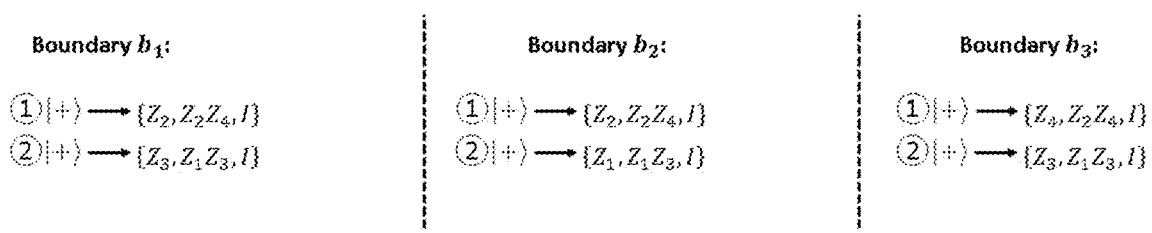

Boundary $b_1$:

① $|+\rangle \longrightarrow \{Z_2, Z_2Z_4, I\}$
② $|+\rangle \longrightarrow \{Z_3, Z_1Z_3, I\}$ Boundary $b_2$:

① $|+\rangle \longrightarrow \{Z_2, Z_2Z_4, I\}$
② $|+\rangle \longrightarrow \{Z_1, Z_1Z_3, I\}$ Boundary $b_3$:

① $|+\rangle \longrightarrow \{Z_4, Z_2Z_4, I\}$
② $|+\rangle \longrightarrow \{Z_3, Z_1Z_3, I\}$

FIG. 9B

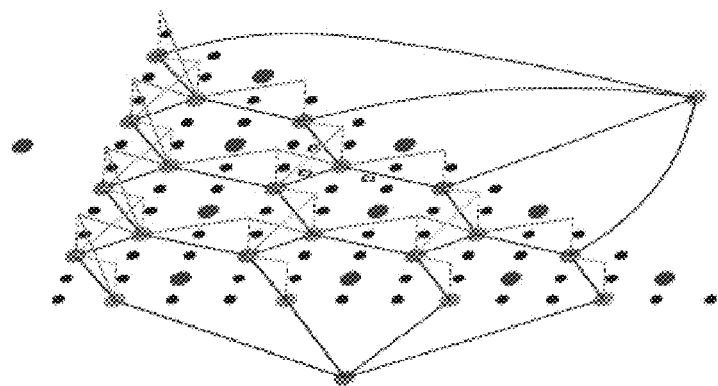
FIG. 16A
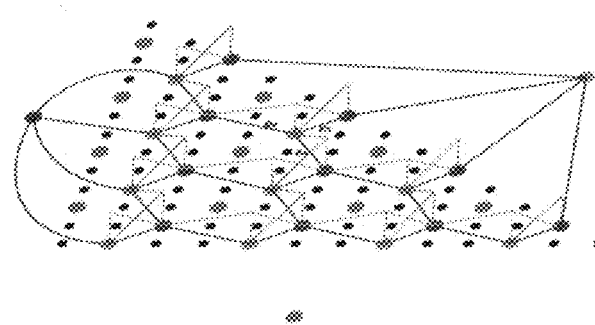 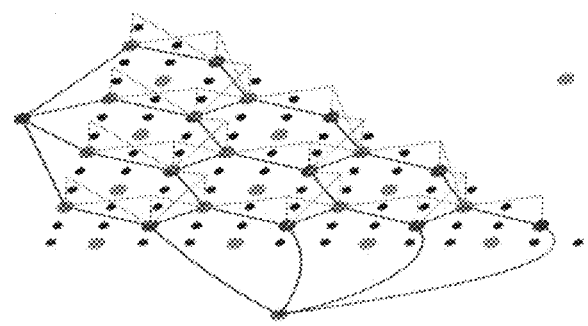
FIG. 16B                FIG. 16C

```
┌─────────────────────────────────────────────────────┐
│  ENCODING, BY A SYSTEM OPERATIVELY COUPLED TO A     │
│  PROCESSOR, A PLURALITY OF DATA QUBITS TO A TRIVALENT│  ← 1702
│  LATTICE FOR A MEASUREMENT OF A PAULI MATRIX        │
│  STABILIZER BASED ON A CONNECTIVITY SCHEME OF A     │
│  QUANTUM CIRCUIT, WHEREIN THE MEASUREMENT IS        │
│  SELECTED FROM THE GROUP CONSISTING OF A WEIGHT-SIX │
│  MEASUREMENT OF THE PAULI MATRIX STABILIZER AND A   │
│  WEIGHT-FOUR MEASUREMENT OF THE PAULI MATRIX        │
│  STABILIZER                                         │
└─────────────────────────────────────────────────────┘
                          │
                          ▼
┌─────────────────────────────────────────────────────┐
│  DETERMINING, BY THE SYSTEM, A FLAG QUBIT OUTCOME   │  ← 1704
│  CORRESPONDING TO A DATA QUBIT ERROR CONFIGURATION  │
│  BASED ON THE CONNECTIVITY SCHEME OF THE QUANTUM    │
│  CIRCUIT ENCODED TO THE TRIVALENT LATTICE THAT MAPS AN│
│  ANCILLA QUBIT TO THE PLURALITY OF DATA QUBITS VIA A │
│  FLAG QUBIT                                         │
└─────────────────────────────────────────────────────┘
```

```
┌─────────────────────────────────────────────────────┐
│ ENCODING, BY A SYSTEM OPERATIVELY COUPLED TO A      │
│ PROCESSOR, A QUANTUM CIRCUIT TO A TRIVALENT LATTICE │──1802
│ THAT MAPS AN ANCILLA QUBIT TO A PLURALITY OF DATA   │
│ QUBITS VIA A PLURALITY OF FLAG QUBITS BASED ON A    │
│ CONNECTIVITY SCHEME OF THE QUANTUM CIRCUIT          │
└─────────────────────────────────────────────────────┘
                          ▼
┌─────────────────────────────────────────────────────┐
│ IDENTIFYING, BY THE SYSTEM, A FLAG QUBIT OUTCOME WITH│
│ CORRESPONDING ERROR CONFIGURATIONS ASSOCIATED WITH  │──1804
│ THE PLURALITY OF DATA QUBITS BASED ON AN ASSOCIATION│
│ BETWEEN THE PLURALITY OF DATA QUBITS AND THE        │
│ PLURALITY OF FLAG QUBITS ON THE TRIVALENT LATTICE   │
└─────────────────────────────────────────────────────┘
                          ▼
┌─────────────────────────────────────────────────────┐
│ DECODING, BY THE SYSTEM, THE TRIVALENT LATTICE USING│
│ AN EDGE OF THE TRIVALENT LATTICE THAT EXTENDS       │──1806
│ BETWEEN TWO ANCILLA QUBITS DURING A MWPM PROCESS OF │
│ A DECODING ALGORITHM                                │
└─────────────────────────────────────────────────────┘
```

TRIVALENT LATTICE SCHEME TO IDENTIFY FLAG QUBIT OUTCOMES

BACKGROUND

The subject disclosure relates to encoding a quantum circuit to a trivalent lattice, and more specifically, to encoding a quantum circuit to a trivalent lattice to facilitate identifying flag qubit outcomes and correlating the flag qubit outcomes to one more data qubit error configurations.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can encode a quantum circuit to a trivalent lattice and/or determine one or more data qubit error configurations based on a detected fault are described.

According to an embodiment, a system is provided. The system can comprise a memory that can store computer executable components. The system can also comprise a processor, operably coupled to the memory, and that can execute the computer executable components stored in the memory. The computer executable components can comprise a graph component that can encode a quantum circuit to a trivalent lattice that maps an ancilla qubit to a plurality of data qubits via a plurality of flag qubits based on a connectivity scheme of the quantum circuit.

According an embodiment, another system is provided. The system can comprise a memory that can store computer executable components. The system can also comprise a processor, operably coupled to the memory, and that can execute the computer executable components stored in the memory. The computer executable components can comprise an outcome component that can determine a flag qubit outcome corresponding to a data qubit error configuration based on a connectivity scheme of a quantum circuit encoded to a trivalent lattice that maps an ancilla qubit to a plurality of data qubits via a flag qubit.

According to an embodiment, a computer-implemented method is provided. The computer-implemented method can comprise encoding, by a system operatively coupled to a processor, a quantum circuit to a trivalent lattice that maps an ancilla qubit to a plurality of data qubits via a plurality of flag qubits based on a connectivity scheme of the quantum circuit.

According to an embodiment, another computer-implemented method is provided. The computer-implemented method can comprise determining, by a system operatively coupled to a processor, a flag qubit outcome corresponding to a data qubit error configuration based on a connectivity scheme of a quantum circuit encoded to a trivalent lattice that maps an ancilla qubit to a plurality of data qubits via a flag qubit.

According to an embodiment, a computer program product for encoding a connectivity scheme of a quantum circuit is provided. The computer program product can comprise a computer readable storage medium having program instructions embodied therewith. The program instructions can be executable by a processor to cause the processor to encode, by the processor, the quantum circuit to a trivalent lattice that maps an ancilla qubit to a plurality of data qubits via a plurality of flag qubits based on the connectivity scheme of the quantum circuit.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5A illustrates a diagram of an example, non-limiting trapezoidal geometry implemented on a trivalent lattice that can characterize a stabilizer measurement circuit and facilitate measuring a weight-four Pauli-Z stabilizer in accordance with one or more embodiments described herein.

FIG. 5B illustrates a diagram of an example, non-limiting trapezoidal geometry implemented on a trivalent lattice that can characterize a stabilizer measurement circuit and facilitate measuring a weight-four Pauli-X stabilizer in accordance with one or more embodiments described herein.

FIG. 9A illustrates a diagram of a diagram of example, non-limiting data qubit error correlations that can be determined based on an encoded trivalent lattice that characterizes a quantum circuit in accordance with one or more embodiments described herein.

FIG. 9B illustrates a diagram of a diagram of example, non-limiting data qubit error correlations that can be determined based on an encoded trivalent lattice that characterizes a quantum circuit in accordance with one or more embodiments described herein.

FIG. 16A illustrates a diagram of example, non-limiting three-dimensional diagonal edges mapped to a trivalent lattice and/or connecting two different two-dimensional graphs for a color coded subgraph in accordance with one or more embodiments described herein.

FIG. 16B illustrates a diagram of example, non-limiting three-dimensional diagonal edges mapped to a trivalent lattice and/or connecting two different two-dimensional graphs for a color coded subgraph in accordance with one or more embodiments described herein.

FIG. 16C illustrates a diagram of example, non-limiting three-dimensional diagonal edges mapped to a trivalent lattice and/or connecting two different two-dimensional graphs for a color coded subgraph in accordance with one or more embodiments described herein.

FIG. 17 illustrates a flow diagram of an example, non-limiting computer-implemented method that can facilitate encoding one or more quantum circuits to a trivalent lattice in accordance with one or more embodiments described herein.

FIG. 18 illustrates a flow diagram of an example, non-limiting computer-implemented method that can facilitate encoding one or more quantum circuits to a trivalent lattice in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Hexagonal color codes are a family of topological codes in which all Clifford gates can be implemented transversally. However, color codes have lower thresholds compared to surface codes in part due to the weight-six Pauli matrix stabilizer measurements compared to the weigh-four Pauli matrix stabilizer measurements of the surface code. Consequently, a small number of faults can lead to high weight errors, and thus the effective distance of the color code can be smaller than the codes actual distance.

Various embodiments of the present invention can be directed to computer processing systems, computer-implemented methods, apparatus and/or computer program products that facilitate the efficient, effective, and autonomous (e.g., without direct human guidance) encoding of a quantum circuit to a trivalent lattice. For example, one or more embodiments described herein can encode flag qubits to the trivalent lattice, which can be used to identify high weight errors arising from a small number of faults in such a way that full code distance can be achieved. Additionally, various embodiments described herein can minimize the number of frequency collisions via implementation of the trivalent lattice.

The computer processing systems, computer-implemented methods, apparatus and/or computer program products employ hardware and/or software to solve problems that are highly technical in nature (e.g., encoding a quantum circuit to a trivalent lattice), that are not abstract and cannot be performed as a set of mental acts by a human. For example, an individual cannot readily analyze a connectivity scheme and encode a quantum circuit to a trivalent lattice as described herein. Further, various embodiments described herein can demonstrate a technical improvement over conventional encoding techniques by facilitating an improved yield of the quantum circuit fabrication process through the reduction of frequency collisions.

Figure 1:
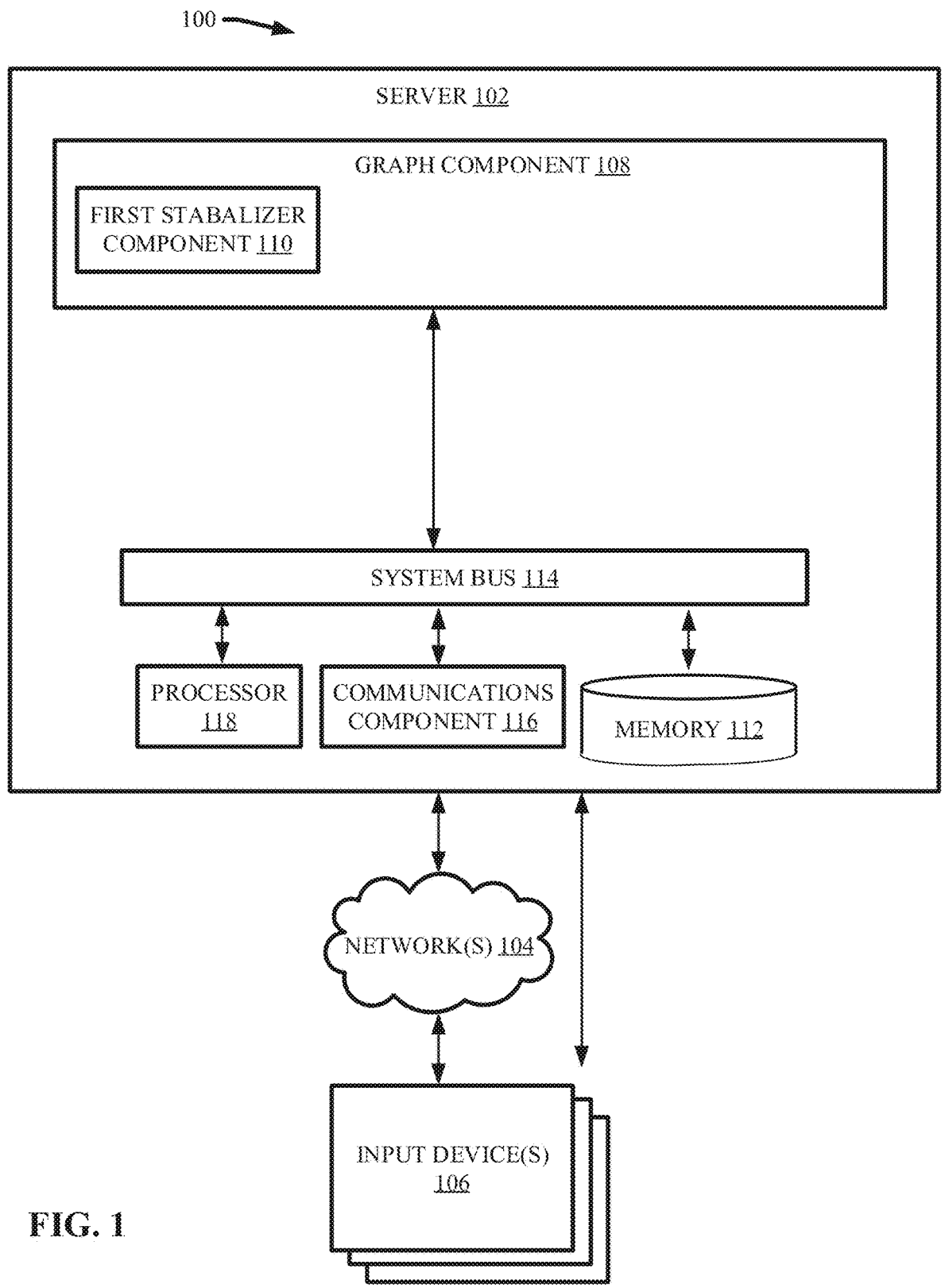
FIG. 1 illustrates a block diagram of an example, non-limiting system that can encode a quantum circuit to a trivalent lattice based on a connectivity scheme that characterizes the quantum circuit in accordance with one or more embodiments described herein.

FIG. 1 illustrates a block diagram of an example, non-limiting system 100 that can encode a quantum circuit to a trivalent lattice. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, and/or one or more input devise 106. The server 102 can comprise graph component 108. The graph component 108 can further comprise first stabilizer component 110. Also, the server 102 can comprise or otherwise be associated with at least one memory 112. The server 102 can further comprise a system bus 114 that can couple to various components such as, but not limited to, the graph component 108 and associated components, memory 112, communications component 116, and/or a processor 118. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the graph component 108 can be provided on the one or more servers 102, it should be appreciated that the architecture of system 100 is not so limited. For example, the graph component 108, or one or more components of graph component 108, can be located at another computer device, such as another server device, a client device, etc.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. A user of the system 100 can utilize the one or more input devices 106 to input one or more connectivity schemes into the system 100, thereby sharing (e.g., via a direct connection and/or via the one or more networks 104) said data with the server 102. For example, the one or more input devices 106 can send data to the communications component 116 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

A user of the system 100 can utilize the one or more input devices 106 and/or the one or more networks 104 to input one or more settings and/or commands into the system 100. For example, in the various embodiments described herein, a user of the system 100 can operate and/or manipulate the server 102 and/or associate components via the one or more input devices 106. Additionally, a user of the system 100 can utilize the one or more input devices 106 to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment.

The communications component 116 can facilitate communications between the one or more input devices 106 and one or more components associated with the server 102. For example, in various embodiments the communications component can facilitate communications between the one or more input devices 106 and the graph component 108.

In various embodiments, the graph component 108 can encode a quantum circuit to a trivalent lattice that maps one or more ancilla qubits to a plurality of data qubits via a plurality of flag qubits based on one or more connectivity schemes of the quantum circuit. For example, the one or more connectivity schemes can regard the composition and/or layout of the quantum circuit. For instance, the one or more connectivity schemes can depict the position and/or type of various quantum gates comprised within the quantum circuit. Further, the one or more connectivity schemes can depict how various qubits of the quantum circuit are entangled with each other. For instance, the one or more connectivity schemes can depict how a given ancilla qubit is entangled with one or more flag qubits and/or data qubits.

In one or more embodiments, the graph component 108 can encode quantum circuit to a trivalent lattice to facilitate production of a superconducting qubit architecture with fixed-frequency transmon qubits coupled via one or more cross resonance ("CR") gates. With regards to the superconducting qubit architecture, reducing a degree of connectivity between ancilla and data qubits can minimize frequency collisions and/or crosstalk errors. The graph component 108 can achieve this reduction in frequency collisions and/or crosstalk errors by encoding one or more quantum circuits on a trivalent lattice such that ancilla qubits and/or data qubits of the given quantum circuit can have degree three connectivity.

For example, the graph component 108 can implement one or more hexagonal geometries and/or a trapezoidal geometries onto the trivalent lattice. The corners of the hexagonal and/or trapezoidal geometries can correspond to data qubits characterized by the one or more connectivity schemes. Further, one or more vertices can be positioned on the trivalent lattice within the one or more hexagonal faces and/or trapezoidal faces delineated by the data qubits. The one or more vertices can correspond to one or more ancilla qubits and/or flag qubits, and can be used to measure the weight of Pauli-X and/or Pauli-Y stabilizers. Additionally, the degree of each vertex can be equal to or less than three, and can thus reduce the number of frequency collisions when one or more controlled NOT ("CNOT") gates are performed using a CR gate.

Figure 2:
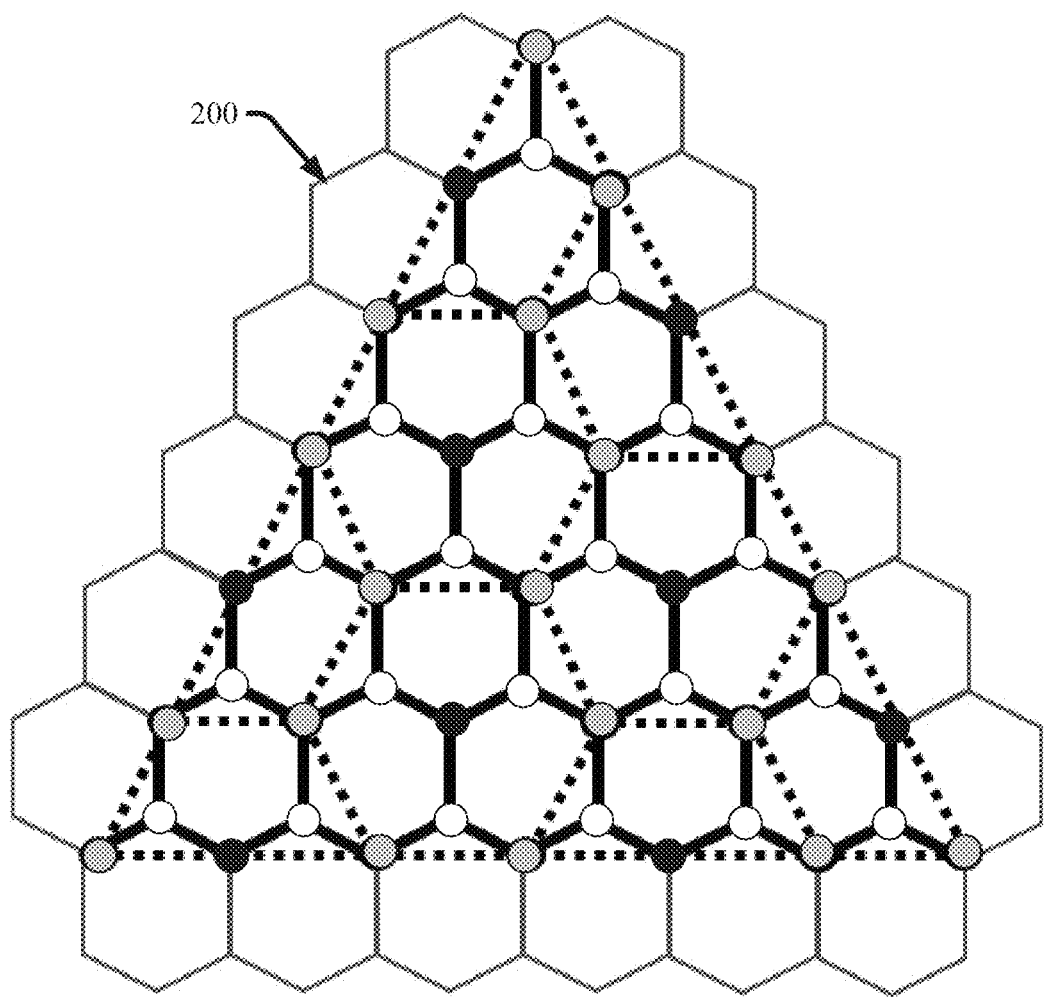
FIG. 2 illustrates a diagram of an example, non-limiting a trivalent lattice that can map one or more ancilla qubits, flag qubits, and/or data qubits based on a connectivity scheme of a quantum circuit in accordance with one or more embodiments described herein.

FIG. 2 illustrates a diagram of an example, non-limiting exemplary trivalent lattice 200 upon which the graph component 108 can encode one or more quantum circuits in accordance with one or more embodiments described herein. Repetitive description of like elements employed in other embodiments described herein is omitted for sake of brevity. As shown in FIG. 2, the exemplary trivalent lattice 200 can be depicted by solid lines extending in a repeating hexagonal geometry. One of ordinary skill in the art will recognize that the size of the exemplary trivalent lattice 200 is not limited to the exemplary size depicted in FIG. 2; rather the size of the exemplary trivalent lattice 200 can depend on the quantum circuit being encoded.

Further, the graph component 108 can implement one or more hexagonal and/or trapezoidal geometries onto the trivalent lattice 200, wherein the implemented hexagonal and/or trapezoidal geometries can be larger than the repeating hexagonal geometry of the trivalent lattice 200. Each hexagonal and/or trapezoidal region can correspond to a Pauli matrix stabilizer measurement circuit (e.g., a weight-six stabilizer measurement or a weight-four stabilizer measurement). Since only one ancilla qubit is needed to measure a given stabilizer, any remaining ancilla qubits within the Pauli matrix stabilizer measurement circuit can serve as flag qubits to correct high weight errors arising from fewer faults.

For example, FIG. 2 depicts the one or more hexagonal and/or trapezoidal geometries that can be implemented by the graph component 108 with dashed lines. As shown in FIG. 2, one or more white vertices can correspond to the plurality of data qubits and/or can be located at the corners of the implemented hexagonal and/or trapezoidal geometries. Further, the one or more yellow vertices depicted in FIG. 2 can correspond to the plurality of flag qubits. The flag qubit vertices can be positioned on trivalent lattice. Additionally, the one or more black vertices depicted in FIG. 2 can correspond to the plurality of ancilla qubits. The ancilla qubit vertices can also be positioned on the trivalent lattice. As shown in FIG. 2, the ancilla qubit vertices (e.g., represented by black circles in FIG. 2) and/or the flag qubit vertices (e.g., represented by yellow circles in FIG. 2) can be positioned within the hexagon or trapezoid regions defined by the implement one or more hexagonal and/or trapezoidal geometries onto the trivalent lattice 200 (e.g., defined by the plurality of data qubit vertices).

For example, as shown in FIG. 2, the boundaries of a hexagonal geometry implemented by the graph component 108 can be defined by six data qubit vertices (e.g., represented by white circles in FIG. 2) positioned at the corners of the hexagonal geometry. Within the hexagon region defined by the hexagonal geometry, the exemplary trivalent lattice 200 can comprise three flag qubits vertices (e.g., represented by yellow circles) and/or an ancilla vertex qubit (e.g., represented by a black circle). Further, the ancilla qubit vertex (e.g., represented by a black circle) within the hexagon region can be connected to the three flag qubit vertices (e.g., represented by yellow circles) via the exemplary trivalent lattice 200. In turn, each of the three flag qubit vertices (e.g., represented by yellow circles) can be connected to two data qubit vertices (e.g., represented by white circles) via the exemplary trivalent lattice 200.

In another example, the boundaries of a trapezoidal geometry implemented by the graph component 108 can be defined by four data qubit vertices (e.g., represented by yellow circles in FIG. 2) positioned at the corners of the trapezoidal geometry. Within the trapezoidal region defined by the trapezoidal geometry, the exemplary trivalent lattice 200 can comprise two flag qubits vertices (e.g., represented by yellow circles) and/or an ancilla vertex qubit (e.g., represented by a black circle). Further, the ancilla qubit vertex (e.g., represented by a black circle) within the trapezoidal region can be connected to the three flag qubit vertices (e.g., represented by yellow circles) via the exemplary trivalent lattice 200. In turn, each of the two flag qubit vertices (e.g., represented by yellow circles) can be connected to two data qubit vertices (e.g., represented by white circles) via the exemplary trivalent lattice 200.

Referring again to FIG. 1, in various embodiments the first stabilizer component 110 can encode the plurality of data qubits to the trivalent lattice (e.g., exemplary trivalent lattice 200) for the measurement of weight-six Pauli-X stabilizers and/or Pauli-Z stabilizers based on the connectivity scheme of the quantum circuit. For example, the first stabilizer component 110 can implement a hexagonal geometry to encode one or more weight-six stabilizer measurement circuits.

Figure 3A:
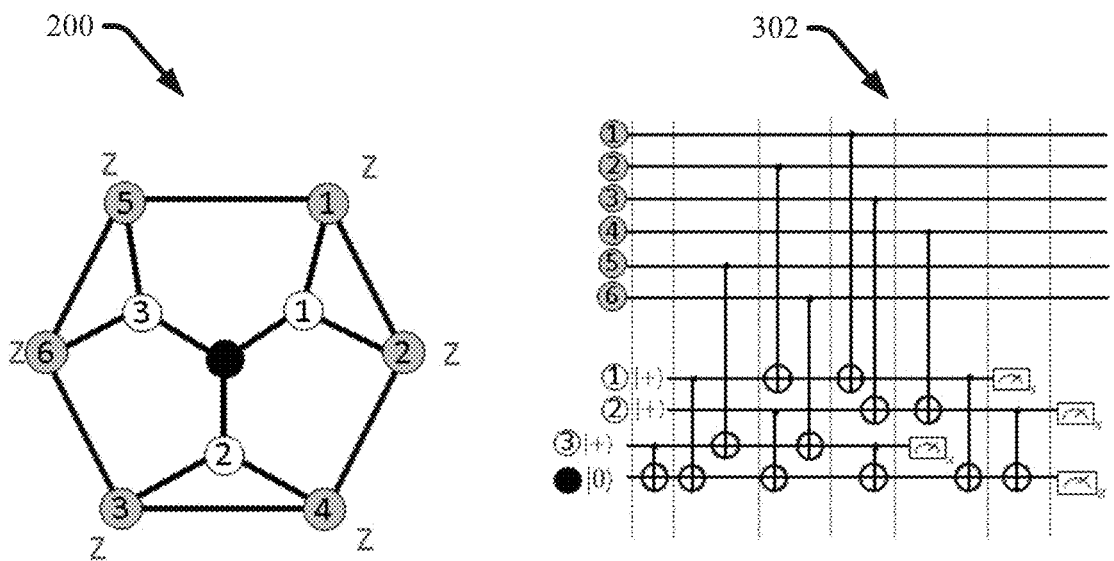
FIG. 3A illustrates a diagram of an example, non-limiting hexagonal geometry implemented on a trivalent lattice that can characterize a stabilizer measurement circuit and facilitate measuring a weight-six Pauli-Z stabilizer in accordance with one or more embodiments described herein.

FIGS. 3A and/or 3B illustrate diagrams of example, non-limiting encoding operations that can be performed by the first stabilizer component 110 in accordance with one or more embodiments described herein. Repetitive description of like elements employed in other embodiments described herein is omitted for sake of brevity. FIG. 3A depicts a first stabilizer measurement circuit 302 that can be encoded by the graph component 108.

As shown in FIG. 3A, the first stabilizer measurement circuit 302 can be a two-flag circuit for measuring weight-six Pauli-Z stabilizers. For example, if "v" faults result in a data qubit error of weight greater than "v", at least one of the flag qubits can flag. The first stabilizer measurement circuit 302 comprise an ancilla qubit delineated by a black circle. Further, the first stabilizer measurement circuit 302 can comprise three flag qubits (e.g., flag qubits "1", "2", and/or "3" as shown in FIG. 3A) delineated by numbered white circles. Also, the first stabilizer measurement circuit 302 can comprise six data qubits (e.g., data qubits "1", "2", "3", "4", "5", and/or "6" as shown in FIG. 3A) delineated by numbered yellow circles.

In various embodiments, the first stabilizer component 110 can encode weight-six Z stabilizer measurement circuits, such as first stabilizer measurement circuit 302, to a trivalent lattice as depicted with reference to the exemplary trivalent lattice 200 in FIG. 3A. For instance, the first stabilizer component 110 can map six data qubit vertices (e.g., represented by yellow circles) corresponding to the numbered data qubits of the first stabilizer measurement circuit 302 to positions on the exemplary trivalent lattice 200 that can define a hexagon region in accordance with the various embodiments described herein.

Further, the first stabilizer component 110 can map three flag qubit vertices (e.g., represented by white circles) corresponding the numbered flag qubits of the first stabilizer measurement circuit 302 to positions on the exemplary trivalent lattice 200 and within the defined hexagon region in accordance with the various embodiments described herein. In addition, each of the three flag qubit vertices are connected to two data qubit vertices based on the connectivity of the first stabilizer measurement circuit 302. For example, the first stabilizer measurement circuit 302 depicts a first flag qubit (e.g., represented by a white circle numbered "1") entangled with a first data qubit (e.g., represented by a yellow circle numbered "1") and a second data qubit (e.g., represented by a yellow circle numbered "2"). Likewise, the exemplary trivalent lattice 200 shown in FIG. 3A depicts a first flag qubit vertex (e.g., represented by a white circle numbered "1") connected to a first data qubit vertex (e.g., represented by a yellow circle numbered "1") and a second data qubit vertex (e.g., represented by a yellow circle numbered "2").

Figure 3B:
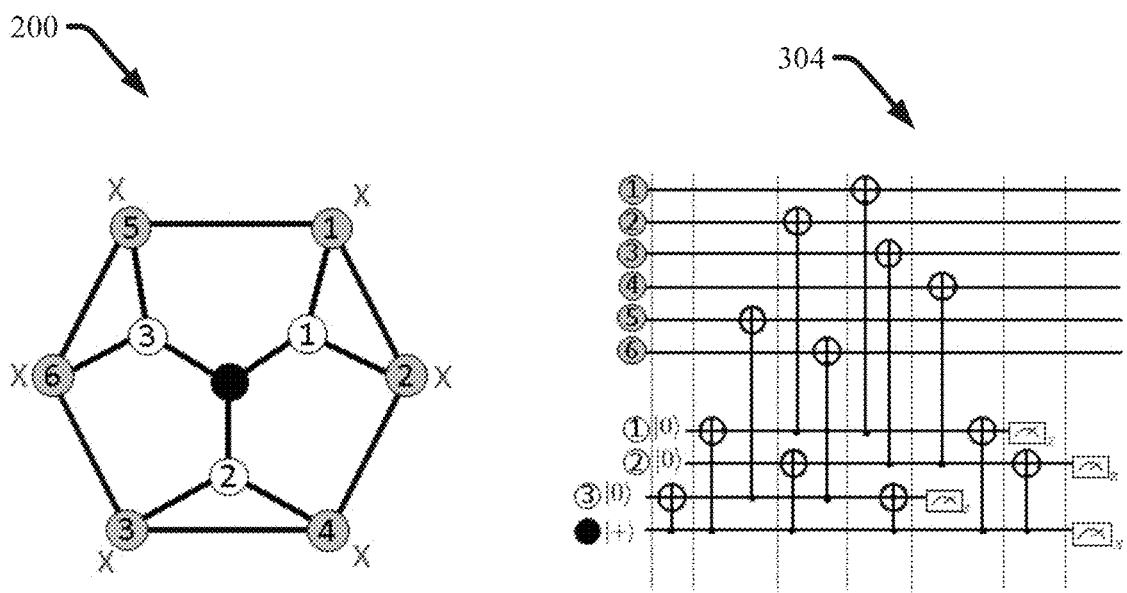
FIG. 3B illustrates a diagram of an example, non-limiting hexagonal geometry implemented on a trivalent lattice that can characterize a stabilizer measurement circuit and facilitate measuring a weight-six Pauli-X stabilizer in accordance with one or more embodiments described herein.

FIG. 3B depicts a second exemplary stabilizer measurement circuit 304. As shown in FIG. 3B, the second stabilizer measurement circuit 304 can be a two-flag circuit for measuring weight-six Pauli-X stabilizers. For example, the quantum circuit can comprise an ancilla qubit delineated in the second stabilizer measurement circuit 304 by a black circle. Further, the second stabilizer measurement circuit 304 can comprise three flag qubits (e.g., flag qubits "1", "2", and/or "3" as shown in FIG. 3B) delineated by numbered white circles. Also, the second stabilizer measurement circuit 304 can comprise six data qubits (e.g., data qubits "1", "2", "3", "4", "5", and/or "6" as shown in FIG. 3B) delineated by numbered yellow circles.

In various embodiments, the first stabilizer component 110 can also encode weight-six X stabilizer measurement circuits, such as second stabilizer measurement circuit 304 to a trivalent lattice as depicted with reference to the exemplary trivalent lattice 200 in FIG. 3B. For instance, the first stabilizer component 110 can map six data qubit vertices (e.g., represented by yellow circles) corresponding to the numbered data qubits of the second stabilizer measurement circuit 304 to positions on the exemplary trivalent lattice 200 that can define a hexagon region in accordance with the various embodiments described herein.

Further, the first stabilizer component 110 can map three flag qubit vertices (e.g., represented by white circles) corresponding the numbered flag qubits of the second stabilizer measurement circuit 304 to positions on the exemplary trivalent lattice 200 and within the defined hexagon region in accordance with the various embodiments described herein. In addition, each of the three flag qubit vertices are connected to two data qubit vertices based on the connectivity of the second stabilizer measurement circuit 304. For example, the second stabilizer measurement circuit 304 depicts a first flag qubit (e.g., represented by a white circle numbered "1") entangled with a first data qubit (e.g., represented by a yellow circle numbered "1") and a second data qubit (e.g., represented by a yellow circle numbered "2"). Likewise, the exemplary trivalent lattice 200 shown in FIG. 3B depicts a first flag qubit vertex (e.g., represented by a white circle numbered "1") connected to a first data qubit vertex (e.g., represented by a yellow circle numbered "1") and a second data qubit vertex (e.g., represented by a yellow circle numbered "2").

Figure 4:
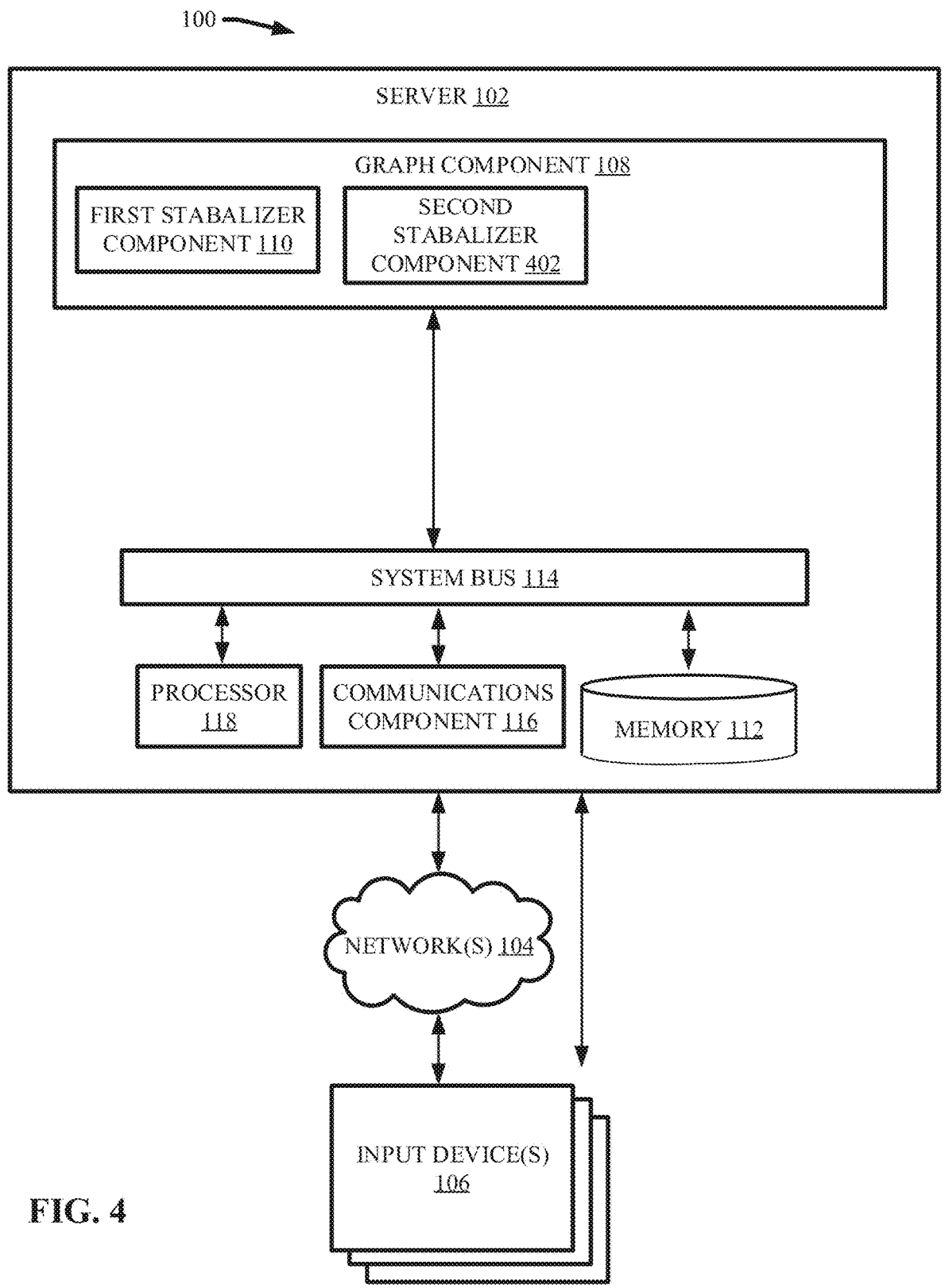
FIG. 4 illustrates a block diagram of an example, non-limiting system that can encode a quantum circuit to a trivalent lattice based on a connectivity scheme that characterizes the quantum circuit in accordance with one or more embodiments described herein.

FIG. 4 illustrates a diagram of the example, non-limiting system 100 further comprising second stabilizer component 402 in accordance with one or more embodiments described herein. Repetitive description of like elements employed in other embodiments described herein is omitted for sake of brevity. In various embodiments, the second stabilizer component 402 can encode the plurality of data qubits to the trivalent lattice (e.g., exemplary trivalent lattice 200) for the measurement of weight-four Pauli-X stabilizers and/or Pauli-Z stabilizers based on the connectivity scheme of the quantum circuit. For example, the second stabilizer component 402 can implement a trapezoidal geometry to encode one or more weight-four stabilizer measurement circuits.

FIGS. 5A and/or 5B illustrate diagrams of example, non-limiting encoding operations that can be performed by the second stabilizer component 402 in accordance with one or more embodiments described herein. Repetitive description of like elements employed in other embodiments described herein is omitted for sake of brevity. FIG. 5A depicts an exemplary third stabilizer measurement circuit 502. As shown in FIG. 5A, the third stabilizer measurement circuit 502 can be a one-flag circuit for measuring weight-four Pauli-Z stabilizers. For example, if a single fault results in a data qubit error of weight greater than one, at least one of the flag qubits can flag. The third stabilizer measurement circuit 502 can comprise an ancilla qubit delineated by a black circle. Further, the third stabilizer measurement circuit 502 can comprise two flag qubits (e.g., flag qubits "1", "2", and/or "3" as shown in FIG. 5A) delineated by numbered white circles. Also, the third stabilizer measurement circuit 502 can comprise four data qubits (e.g., data qubits "1", "2", "3", "4" as shown in FIG. 5A) delineated by numbered yellow circles.

In various embodiments, the second stabilizer component 402 can encode weight-four Z stabilizer measurement circuits, such as third stabilizer measurement circuit 502, to a trivalent lattice as depicted with reference to the exemplary trivalent lattice 200 in FIG. 5A. For instance, the second stabilizer component 402 can map four data qubit vertices (e.g., represented by yellow circles) corresponding to the numbered data qubits of the third stabilizer measurement circuit 502 to positions on the exemplary trivalent lattice 200 that can define a trapezoidal region in accordance with the various embodiments described herein.

Further, the second stabilizer component 402 can map two flag qubit vertices (e.g., represented by white circles) corresponding the numbered flag qubits of the third stabilizer measurement circuit 502 to positions on the exemplary trivalent lattice 200 and within the defined trapezoidal region in accordance with the various embodiments described herein. In addition, each of the two flag qubit vertices are connected to two data qubit vertices based on the connectivity of the third stabilizer measurement circuit 502. For example, the third stabilizer measurement circuit 502 depicts a first flag qubit (e.g., represented by a white circle numbered "1") entangled with a second data qubit (e.g., represented by a yellow circle numbered "2") and a fourth data qubit (e.g., represented by a yellow circle numbered "4") Likewise, the exemplary trivalent lattice 200 shown in FIG. 5A depicts a first flag qubit vertex (e.g., represented by a white circle numbered "1") connected to a second data qubit vertex (e.g., represented by a yellow circle numbered "2") and a fourth data qubit vertex (e.g., represented by a yellow circle numbered "4").

FIG. 5B depicts an exemplary fourth stabilizer measurement circuit 504 that can characterize another quantum circuit. As shown in FIG. 5B, the fourth stabilizer measurement circuit 504 can be a one-flag circuit for measuring weight-four Pauli-X stabilizers. For example, the fourth stabilizer measurement circuit 504 can comprise an ancilla qubit delineated by a black circle. Further, the fourth stabilizer measurement circuit 504 can comprise two flag qubits (e.g., flag qubits "1", "2", and/or "3" as shown in FIG. 5B) delineated by numbered white circles. Also, the fourth stabilizer measurement circuit 504 can comprise four data qubits (e.g., data qubits "1", "2", "3", "4" as shown in FIG. 5B) delineated by numbered yellow circles.

In various embodiments, the second stabilizer component 402 can also encode weight-four Z stabilizer measurement circuits, such as fourth stabilizer measurement circuit 504, to a trivalent lattice as depicted with reference to the exemplary trivalent lattice 200 in FIG. 5B. For instance, the second stabilizer component 402 can map four data qubit vertices (e.g., represented by yellow circles) corresponding to the numbered data qubits of the fourth stabilizer measurement circuit 504 to positions on the exemplary trivalent lattice 200 that can define a trapezoidal region in accordance with the various embodiments described herein.

Further, the second stabilizer component 402 can map two flag qubit vertices (e.g., represented by white circles) corresponding the numbered flag qubits of the fourth stabilizer measurement circuit 504 to positions on the exemplary trivalent lattice 200 and within the defined hexagon region in accordance with the various embodiments described herein. In addition, each of the two flag qubit vertices are connected to two data qubit vertices based on the connectivity of the fourth stabilizer measurement circuit 504. For example, the fourth stabilizer measurement circuit 504 depicts a first flag qubit (e.g., represented by a white circle numbered "1") entangled with a second data qubit (e.g., represented by a yellow circle numbered "2") and a fourth data qubit (e.g., represented by a yellow circle numbered "4") Likewise, the exemplary trivalent lattice 200 shown in FIG. 5B depicts a first flag qubit vertex (e.g., represented by a white circle numbered "1") connected to a second data qubit vertex (e.g., represented by a yellow circle numbered "2") and a fourth data qubit vertex (e.g., represented by a yellow circle numbered "4").

Figure 6:
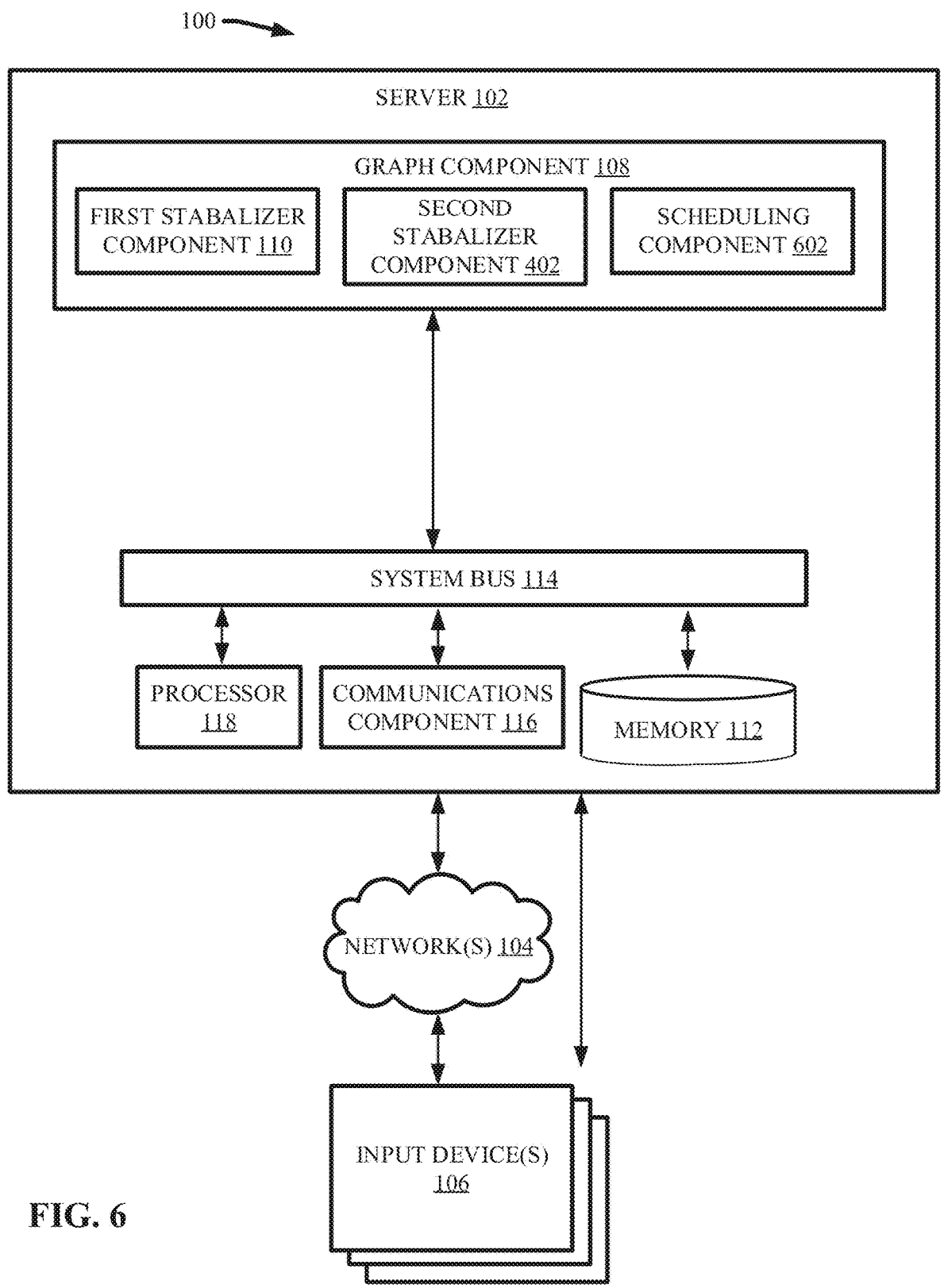
FIG. 6 illustrates a block diagram of an example, non-limiting system that can encode a quantum circuit to a trivalent lattice based on a connectivity scheme that characterizes the quantum circuit in accordance with one or more embodiments described herein.

FIG. 6 illustrates a diagram of the example, non-limiting system 100 further comprising scheduling component 602 in accordance with one or more embodiments described herein. Repetitive description of like elements employed in other embodiments described herein is omitted for sake of brevity. In various embodiments, the scheduling component 602 can perform CNOT scheduling for the measurement of the Pauli-X and/or Pauli-Z stabilizers. In one or more embodiments, the scheduling component 602 can avoid scheduling conflicts by adjusting the CNOT scheduling for the weight-four checks at the boundaries of the trivalent lattice.

Figure 7:
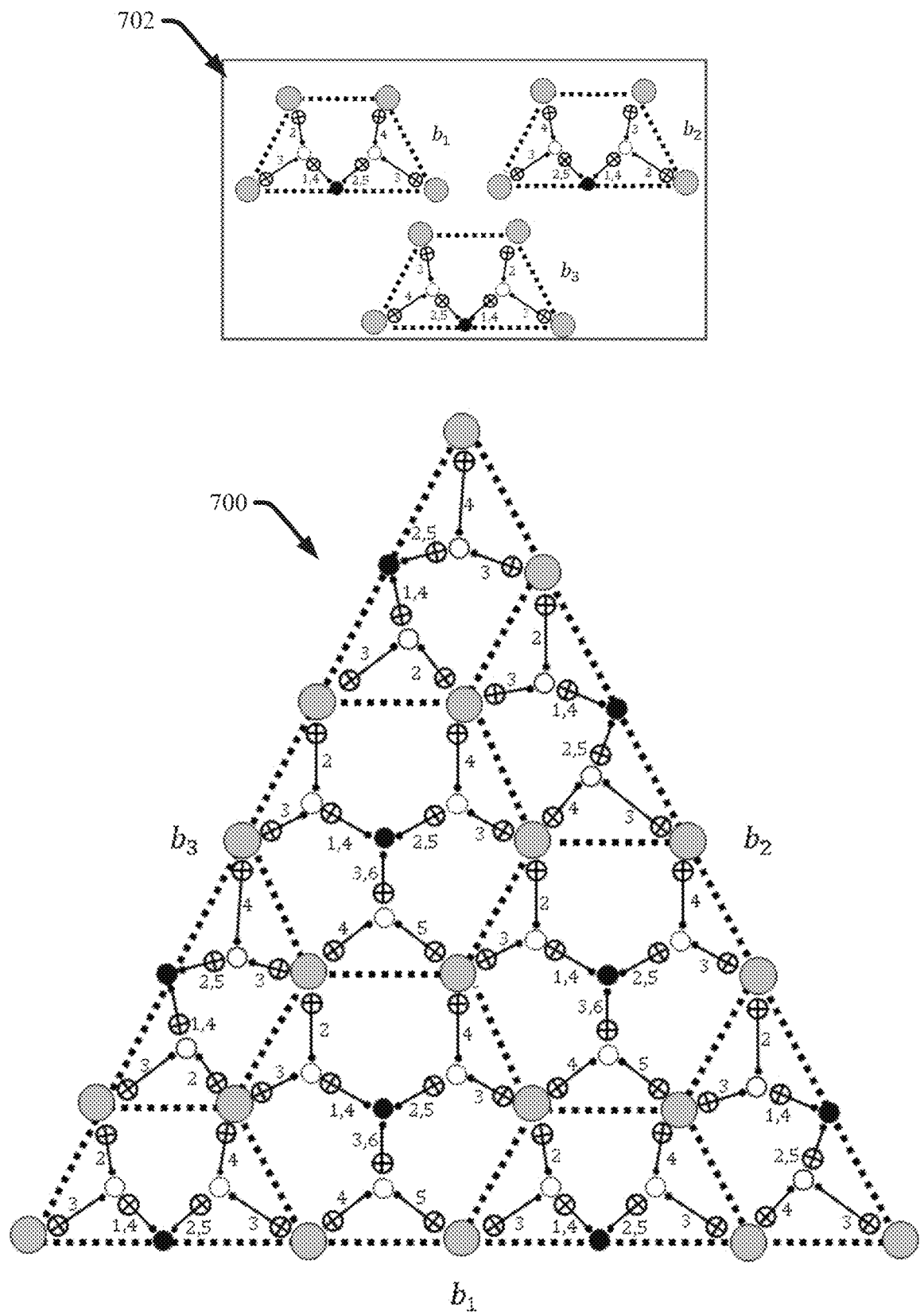
FIG. 7 illustrates a diagram of an example, non-limiting a trivalent lattice that can map one or more ancilla qubits, flag qubits, and/or data qubits and incorporate a scheduling scheme based on a connectivity scheme of a quantum circuit in accordance with one or more embodiments described herein.

FIG. 7 illustrates a diagram of an example, non-limiting scheduling scheme 700 that can be generated by the scheduling component 602 in accordance with one or more embodiments described herein. Repetitive description of like elements employed in other embodiments described herein is omitted for sake of brevity. FIG. 7 depicts a CNOT scheduling scheme 700 for a trivalent lattice having a code distance of five. For example, FIG. 7 can illustrate a full CNOT scheduling scheme 700 for one cycle of X stabilizer measurements that can minimize a total circuit depth.

For example, the trivalent lattice can be defined by three boundaries (e.g., represented by "$b_1$", "$b_2$", and/or "$b_3$" in FIG. 7), wherein each boundary can comprise five data qubit vertices. As shown in FIG. 7, the scheduling component 602 can generate the scheduling scheme 700 based on the time steps associated with the one or more ancilla qubit vertices, flag qubit vertices, and/or data qubit vertices (e.g., integers 1 through 6 depicted adjacent to the associate qubit vertex). As depicted within frame 702, the scheduling component 602 can generate the scheduling scheme while avoiding one or more scheduling conflicts by ensuring that the CNOT scheduling for the weight-four checks at the boundaries $b_1$, $b_2$, and/or $b_3$ are different. If the same CNOT scheduling for weight-four stabilizer measurements were used at the boundaries (e.g., represented by "$b_1$", "$b_2$", and/or "$b_3$"), an additional time step would be required to perform the X stabilizer measurements. Therefore, the scheduling component 602 can utilize different scheduling for the weight-four stabilizers at each boundary.

Figure 8:
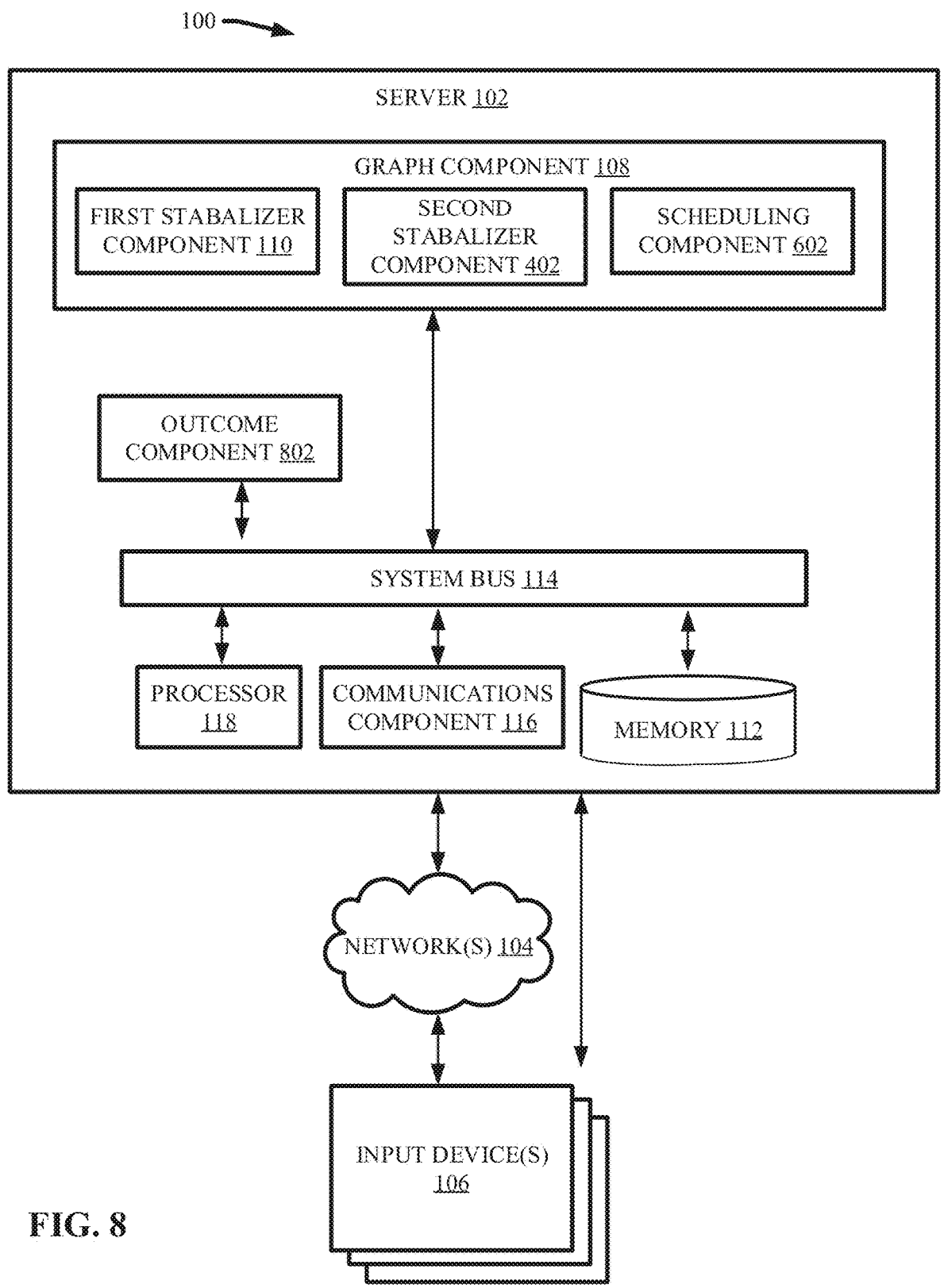
FIG. 8 illustrates a block diagram of an example, non-limiting system that can determine one or more flag qubit outcomes corresponding to one or more data qubit error configurations based on a connectivity scheme that characterizes the quantum circuit in accordance with one or more embodiments described herein.

FIG. 8 illustrates a diagram of the example, non-limiting system 100 further comprising outcome component 802 in accordance with one or more embodiments described herein. Repetitive description of like elements employed in other embodiments described herein is omitted for sake of brevity. In various embodiments, the outcome component 802 can determine one or more flag qubit outcomes corresponding to one or more data qubit error configurations based on one or more connectivity schemes of a quantum circuit encoded to a trivalent lattice (e.g., exemplary trivalent lattice 200).

For a code distance ("d"), the outcome component 802 can enable the correction of errors arising from any set of at most (d−1)/2 faults. Since errors from faults combine linearly, the outcome component 802 can detect errors arising from any set of (d−1) faults flagged by the flag qubits. For example, whenever two or more errors are placed on the data from faults in the stabilizer measurements (e.g., encoded via the first stabilizer component 110 and/or the second stabilizer component 402), either a flag qubit can flag or at least two faults can have occurred. Also, any logic Pauli operator is supported on data qubits in the trivalent lattice in such a way that its support intersects the support of a stabilizer at either 0, 2, 4, or 5 sites. Partition qubits in the logical Pauli's support can belong to individual stabilizers (e.g., without sharing qubits) with m being the number of stabilizers that can own i such qubits. The size of the support of the logical Pauli operator can be at least $d+2m_4+6m_6$. In view of the above, an undetected (e.g., no flag qubits flagged or ancilla qubits triggered) logical Pauli operator may not result from fewer than d faults.

In various embodiments, the outcome component 802 can utilize one-flag circuits encoded by the graph component 108 to measure the Pauli matrix stabilizers while enabling full code distance "d". For example, within a single cycle of syndrome extraction, any set of d−1 or fewer faults does not cause a logical error to be placed on the data without any flag qubits flagging. Thereby, two different sets of [(d−1)/2] or fewer faults can be distinguished either by flags or by future cycle of syndrome extraction.

If the circuits measuring Z- or X-type stabilizers propagate errors from ancilla qubits to data qubits, then the resulting errors on the data can be Z or X errors, respectively. If it takes "$f_0$" faults to place a nontrivial logical operator "P" without flag qubits flagging, then the outcome component 802 can use f≤$f_0$ faults to place the logical operator Z(P) and f'≤$f_0$ faults to place logical operator X(P), wherein Z(P) is a Z-type Pauli string with Pauli Z wherever P has Z or Y and with identify elsewhere and X(P)=PZ(P). As P is nontrivial, at least one of Z(P) and X(P) can also be nontrivial while being entirely Z- or X-type. Using code symmetry, the outcome component 802 can assume Z(P) is nontrivial. In the remainder, the outcome component 802 can restrict attention to errors of purely Z-type and establish a lower bound of $f_0 \geq f \geq d$.

Given a logical Pauli operator P of Z-type, the outcome component 802 can associate parts of its support to each face. During a single cycle of syndrome extraction, faults in the circuit measuring the stabilizer on face I can result in Z errors on qubits in a set $A_i$. If there are s faces and Δ is the symmetric difference operation on sets, the outcome component 802 can refer to the collection of sets $\{A_i\}$ an over-partition of supp (P) because supp (P)=$A_1 \Delta A_2 \Delta \ldots \Delta A_s$. If $A_i \cap A_j = \emptyset$ for all i≠j, then $\{A_i\}$ is actually a partition, supp (P)=$A_1 \cap A_2 \cap \ldots \cap A_s$. Let $a_x = |\{i : |A_i| = x\}|$ for x=0, 1, ..., 6 the outcome component 802 can count the number of sets of size x. Further, $\Sigma_{x=0}^{6} a_x = s$ and $|supp(P)| \leq \Sigma_{x=1}^{6} x a_x$ for any over-partition with equality if and only if $\{A_i\}$ is a partition. A given logical operator can have multiple over-partitions and multiple partitions. There can be a partition $\{A_i'\}$ for each over-partition $\{A_i\}$ such that $A_i' \subseteq A_i$ (e.g., formed, for instance, by repeatedly finding a qubit, if it exists, that appears in two sets $A_i$ and $A_j$ and removing it from both). Further, $\{A_i'\}$ can be a sub-partition of $\{A_i\}$.

The outcome component 802 can observe at least the following two facts. First, if a 1-flag circuit syndrome extraction results in two or more errors on the data, either more than one fault has occurred in the circuit or a flag has flagged. Second, $|\text{supp}(P)| \geq d + a_3' + 2a_4' + 4a_5' + 6a_6'$ for any partition $\{A_i'\}$. For example, since $\{A_i\}$ can be a partition for a logical operator P, replacing $A_i$ with $\bar{A}_i$ (e.g., the complement of $A_i$ within the support of face i) can be an over-partition for another logical operator, namely P times a stabilizer on face i. The outcome component 802 can therefore choose $B_i = A_i$ if $|A_i| \leq 3$ and $B_i = \bar{A}_i$ if $|A_i| \geq 4$ to get an over-partition for a logical operator Q. Then $b_4 = b_5 = b_6 = 0$, $b_0 \geq a_0 + a_6$, $b_1 = a_1 + a_5$, $b_2 \leq a_2 + a_4$ and $b_3 = a_3$. If all faces were hexagonal, there can be equality in all the relations between $b_x$ and $a_x$, but the presence of square faces can render the inequalities correct. Therefore, $d \leq |\text{supp}(Q)| \leq b_1 + 2b_2 + 3b_3 \leq |\text{supp}(P)| - 2a_4 - 4a_5 - 6a_6 := N$.

In view of the above, if Q is a logical operator with over-partition $\{B_i\}$ such that $|B_i| \leq 3$ for all i, $b_3 > 0$, and $|\text{supp}(Q)| \leq b_1 + 2b_2 + 3b_3 \leq N$, then there can be another logical operator Q' with over-partition $\{B_i'\}$ such that $|B_i| \leq 3$ for all i, $b_3' < b_3$, and $|\text{supp}(Q')| \leq b_1' + 2b_2' + 3b_3' \leq N - (b_3 - b_3')$. Further, there can be a logical operator R with over-partition $\{G_i\}$ such that $g_3 = g_4 = g_5 = g_6 = 0$ and $d \leq |\text{supp}(R)| \leq N - a_3$, wherein incorporating N into the last inequality can complete a proof of the second fact observed by the outcome component 802, as described above.

For instance, the proof can proceed in two steps. In a first step, a sub-partition $\{C_i\}$ for Q, such $|\text{supp}(Q)| = c_1 + 2c_2 + 3c_3 \leq (b_1 + 2b_2 + 3b_3) - (b_3 - c_3)$. The inequality can hold at least because $b_3 - c_3$ sets $B_i$ with size three can become sets $C_i$ with size two or less during the sub-partition algorithm. However, it may be that $c_3 = b_3$. In a second step, a face i can be found such that $|C_i| = 3$. Since Q can be logical, it can commute with the stabilizer on face i and can overlap with the face's support; thereby implying another qubit $q \in \text{supp}(Q)$ but $q \notin C_i$ so $q \in C_j$ for some $j \neq i$. In turn, a new over-partition $\{B_i'\}$ can be defined for another logical operator Q'. Further:

$$|supp(Q')| \leq b_1' + 2b_2' + 3b_3' = \begin{cases} |supp(Q)| - 2, \text{ face } i \text{ is a hexagon} \\ |suup(Q)| - 4, \text{ face } i \text{ is a square} \end{cases} \leq |supp(Q)| - 2$$

Wherein $b_3 \geq c_3 \geq b_3' \geq c_3 - 2$, such that $|\text{supp}(Q')| \leq b_1' + 2b_2' + 3b_3' \leq |\text{supp}(Q)| - (c_3 - b_3') \leq N - (b_3 - b_3')$.

Therefore, it can take at least two faults to create errors on all qubits in $A_i$ if $|A_i| \geq 2$ (e.g., implying a total of $f \geq a_1 + 2\Sigma_{x=2}^6 a_x = 2s - a_1 - 2a_0$ faults). Further, $\Sigma_{x=1}^6 xa_x = |\text{supp}(P)| \geq d + a_3 + 2a_4 + 4a_5 + 6a_6$ whose rearrangement shows $d \leq a_1' + 2a_2' + 2a_3 + 2a_4 + a_5 \leq f$.

In response to a flagging event by the one or more flagging qubits, the outcome component 802 can analyze the trivalent lattice encoded (e.g., via the graph component 108) to characterize the given quantum circuit in order to determine possible data qubit error configurations that can cause the flagging event. For example, wherein the outcome component 802 detects a fault (e.g., a single fault) during a $Z^{\otimes 6}$ stabilizer measurement, the outcome component 802 can determine one or more possible data qubit errors based on a hexagonal geometry implemented on a trivalent lattice by the first stabilizer component 110 to characterize the connectivity scheme of the given qubit circuit (e.g., such as the trivalent lattice depicted in FIG. 3A). For instance, the encoded trivalent lattice can depict which data qubits are connected to the triggered flag qubit and thereby can be associated with the detected fault.

FIG. 9A illustrates a diagram of example, non-limiting data qubit error correlations that can be determined by the outcome component 802 in accordance with one or more embodiments described herein. Repetitive description of like elements employed in other embodiments described herein is omitted for sake of brevity. FIG. 9A depicts six data qubit error correlations that can be determined by the outcome component 802. For clarity, the exemplary data qubit error correlations depicted in FIG. 9A can be based on the encoded exemplary trivalent lattice depicted in FIG. 3A. For each of the exemplary data qubit error correlations; left of the arrow can be presented a possible flag outcome regarding the three flag qubits of the first stabilizer measurement component 302, and right of the arrow can be presented a possible data qubit error that can correspond to the given flag outcome.

FIG. 9A can show the possible data qubit errors arising from a single fault leading to non-trivial flag qubit measurement outcomes. For example, for weight-six Z-stabilizers, the non-trivial data qubit error that can arise from a single fault resulting in two non-trivial flag measurements is $Z_3 Z_4$ (e.g., where the first and third flag qubits can have non-trivial measurement outcomes). Other errors arising from a single fault which results in more than one non-trivial flag measurement outcome can avoid propagation to the data qubits. Further, a single fault can result in data qubit error of weight value of at less than or equal to two.

For instance, FIG. 9A illustrates the possible flag qubit outcomes and/or data qubit error correlations arising from a single fault during the $Z^{\otimes 6}$ stabilizer measurement characterized by the exemplary trivalent lattice 200 depicted in FIG. 3A. The flag qubit outcomes and/or data qubit error correlations arising from a single fault during the $X^{\otimes 6}$ stabilizer measurement characterized by the exemplary trivalent lattice 200 depicted in FIG. 3B can be identical to those depicted in FIG. 9A but with "Z" replaced with "X". For example, if a single fault results in the measurement of the first flag qubit to be −1 and the other two flag outcomes to be +1, then the possible data qubit errors can be $Z_2$, $Z_1 Z_2$, and the identity.

FIG. 9B illustrates a diagram of further example, non-limiting data qubit error correlations that can be determined by the outcome component 802 in accordance with one or more embodiments described herein. Repetitive description of like elements employed in other embodiments described herein is omitted for sake of brevity. FIG. 9B can depict data qubit error correlations regarding weight-four stabilizer measurements. For clarity, the exemplary data qubit error correlations depicted in FIG. 9B can be based on the encoded exemplary trivalent lattice depicted in FIG. 5A.

As shown in FIG. 9B, for the weight-four stabilizer measurements, since the CNOT scheduling can be different for each of the three boundaries (e.g., $b_1$, $b_2$, and/or $b_3$), the possible data qubit error arising from a non-trivial flag measurement can depend on the particular boundary. Further, a single fault can result in less than or equal to one non-trivial flag qubit measurement outcome.

For example, FIG. 9B can show possible flag outcomes and corresponding possible data qubit errors that can identified by the outcome component 802 from a single fault during a $Z^{\otimes 4}$ stabilizer measurement characterized by the exemplary trivalent lattice 200 depicted in FIG. 3A. The flag qubit outcomes and/or data qubit error correlations arising from a single fault during the $X^{\otimes 4}$ stabilizer measurement characterized by the exemplary trivalent lattice 200 depicted in FIG. 5B can be identical to those depicted in FIG. 9B but with "Z" replaced with "X". As shown in FIG. 7, for weight-four stabilizers, each of the boundaries (e.g., "$b_1$", "$b_2$", "$b_3$") can have a different CNOT scheduling. Therefore, the data qubit errors arising from a flagging event can depend on the particular boundary. FIG. 9B illustrates exemplary data qubit error correlations regarding each the three possible boundaries.

Figure 10:
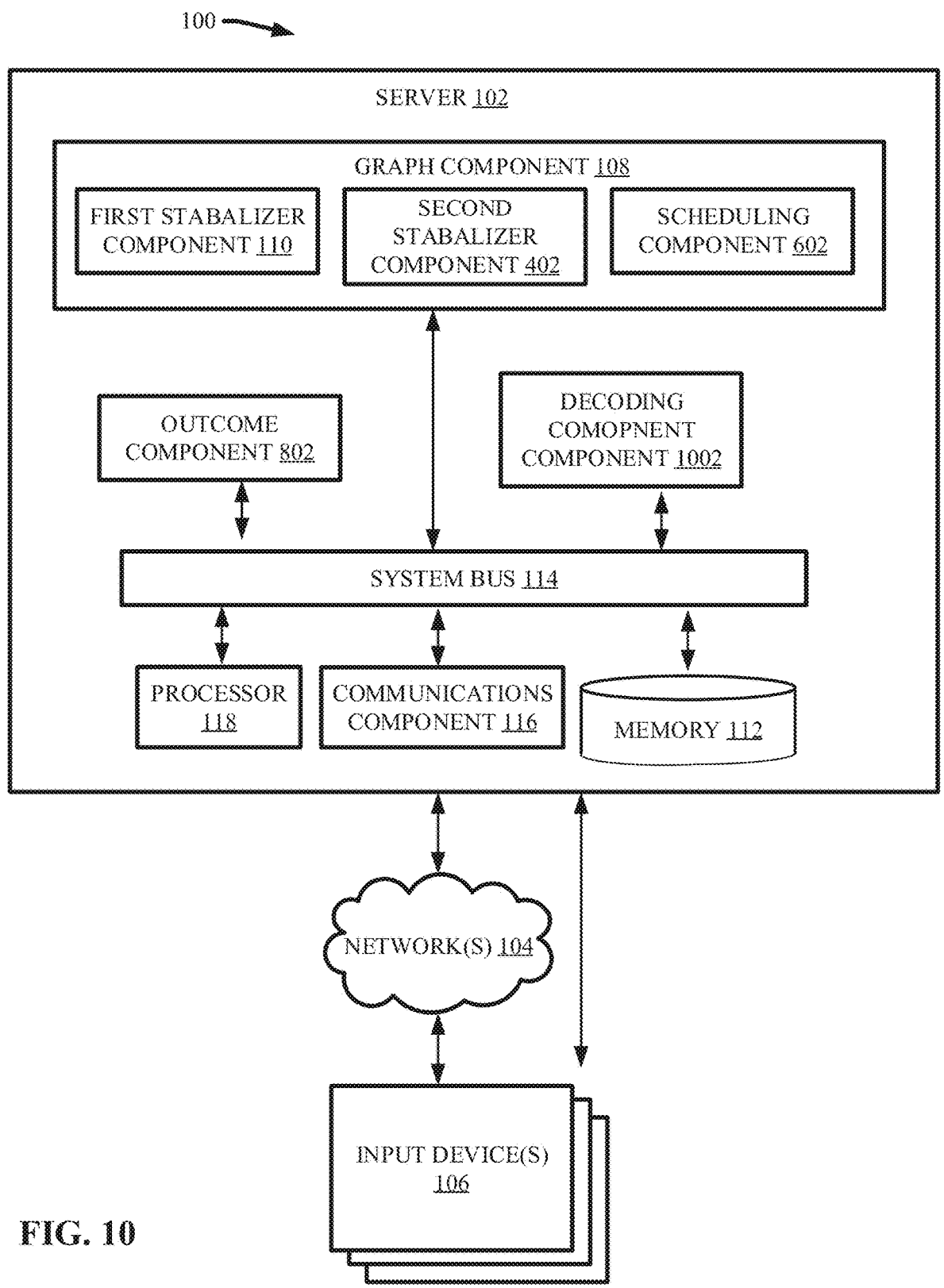
FIG. 10 illustrates a block diagram of an example, non-limiting system that can decode one or more encoded trivalent lattices that characterize a quantum circuit in accordance with one or more embodiments described herein.

FIG. 10 illustrates a diagram of the example, non-limiting system 100 further comprising decoding component 1002 in accordance with one or more embodiments described herein. Repetitive description of like elements employed in other embodiments described herein is omitted for sake of brevity. In various embodiments, the decoding component 1002 can utilize an edge of the trivalent lattice that extends between two ancilla qubits during a minimum-weight perfect matching ("MWPM") process of an algorithm to decode the trivalent lattice. For example, wherein a flag edge on an encoded (e.g., via graph component 108) trivalent lattice is highlighted during a MWPM, the decoding component 1002 can project the edges onto the four corresponding two-dimensional ("2D") edges that encircle the two corresponding qubits.

In one or more embodiments, the decoding component 1002 can compute one or more edge weights regarding one or more encoded trivalent lattices (e.g., exemplary trivalent lattice 200). For example, consider a trivalent lattice that maps red, green, and/or blue vertices for a family of hexagonal color codes, wherein each face of the hexagonal geometry can correspond to a data qubit. The flag qubit measurement outcomes during a weight-four or weight-six stabilizer measurement can be represented by "f". If f corresponds to a flag outcome in FIGS. 9A and/or 9B, the corresponding data qubits that can be afflicted by errors can be comprised within the set "E". The decoding component 1002 can multiply the edge weight probabilities for edges outside of E (e.g., edges not incident to faces corresponding to data qubits in E) by the depolarizing error probability "p". Further, edge weight probabilities for edges incident to data qubits in E can retain the original values.

Figure 11:
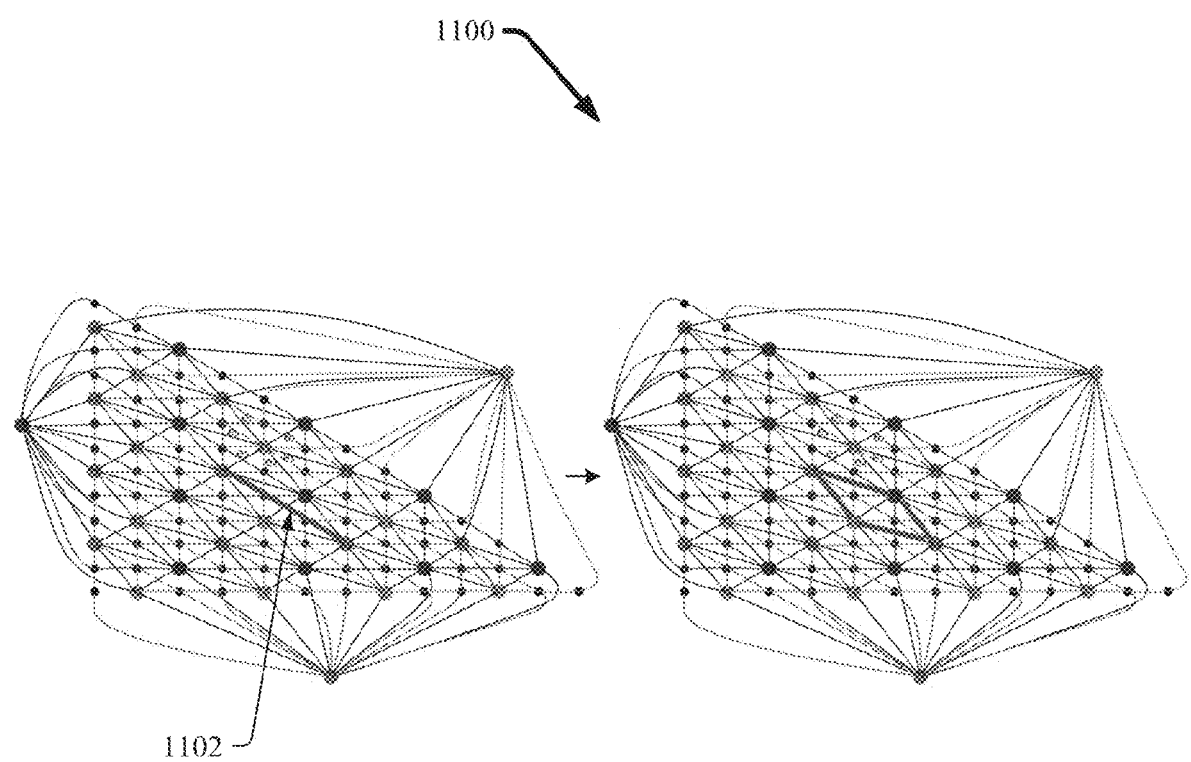
FIG. 11 illustrates a diagram of an example, non-limiting flag scheme that can facilitate decoding one or more encoded trivalent lattices that characterize a quantum circuit in accordance with one or more embodiments described herein.

FIG. 11 illustrates a diagram of an example, non-limiting flag scheme 1100 that can be performed by the decoding component 1002 in accordance with one or more embodiments described herein. Repetitive description of like elements employed in other embodiments described herein is omitted for sake of brevity. FIG. 11 depicts an encoded trivalent lattice (e.g., encoded via graph component 108 in accordance with one or more embodiments described herein) comprising a plurality of edge lines. During the flag scheme 1100, an edge line, such as exemplary edge line 1102 (e.g., represented by a thick bold line), can be chosen during the MWPM step of a decoding algorithm. As shown in FIG. 11, the decoding component 1002 can project the chosen edge line (e.g., exemplary edge line 1102) to four other 2D edges that encircle the two corresponding qubits crossed by the chosen edge line (e.g., crossed by exemplary edge line 1102).

For example, the flag edges can be added to a color code matching trivalent lattice (e.g., an encoded trivalent lattice with three color coding scheme) in accordance with the various embodiments described herein. Since a single fault causing a flag can result in a data qubit error of weight less than or equal to two, flag edges can be added such that choosing an edge during the matching step of a decoding algorithm can allow both data qubits to be identified when performing the lift. FIG. 11 can depict the 2D color-coded encoded trivalent lattice with added flag edges that can connect two vertices of the same color using the determinations made by the outcome component 802 (e.g., the exemplary results shown in FIGS. 9A and/or 9B). For a weight-six stabilizer, the possible weight two data qubit errors that can arise from a single fault can be $E_{q1}E_{q2}$, $E_{q3}E_{q4}$, and/or $E_{q5}E_{q6}$ (e.g., wherein $E_{qi}$ can be $X_{qi}$ or $Z_{qi}$, depending on whether an X- or Z-type stabilizer is being measured). At least because the weight two-data qubit errors can result in highlighted vertices of the same color, each ancilla vertex can be encircled by three flag edges connecting vertices of the same color.

FIG. 11 shows a highlighted green flag edge corresponding to a weight-two data qubit error $E_{q1}E_{q2}$ connecting two highlighted green vertices. For instance, FIG. 11 can illustrate a case in which a single fault during a weight-six stabilizer measurement circuit with red vertex $v_t$ can result in the weight-two data qubit error $E_{q1}E_{q2}$. Further, the weight of the flag edge, along with the other edges, can be renormalized by the decoding component 1002. For example, if there were no other faults, then the green flag edge can be chosen during the matching step of the decoding algorithm, as illustrated in FIG. 11. In contrast, if the two data qubit errors $E_{q1}E_{q2}$ had arisen from failures at the first and second data qubits (e.g., $q_1$ and/or $q_2$), then the four edges shown in FIG. 11 can be highlighted during the MWPM step. Thereby, prior to implementing a lift step of the decoding algorithm, the decoding component 1002 can project the highlighted flag edge to the four 2D edges, as shown in FIG. 11.

Flag edges can be used for weight-two errors arising from a single fault. A given flag edge can be chosen by the decoding component 1002 in two or less subgraphs when performing a MWPM. For example, as depicted in FIG. 11, the subgraphs can be red-green and green-blue. IF a flag edge is highlighted when performing the MWPM on a given subgraph, the decoding component 1002 can project the flag edge to two 2D edges belonging to the given subgraph. In the presence of other errors, it is possible for a flag edge to be chosen in one of the two possible subgraphs it belongs to, wherein the flag edge can be projected onto two 2D edges instead of four. Further, two-qubit errors arising when there are flags (e.g., as depicted in FIG. 9A) can result in two highlighted vertices of the same color.

Regarding the edge weight renormalization that can be performed by the decoding component 1002, the decoding component 1002 can assume the following depolarizing noise model:

1. With probability p, each single-qubit gate location can be followed by a Pauli error drawn uniformly and independently from {X,Y,Z}.
2. With probability p, each two-qubit gate is followed by a two-qubit Pauli error drawn uniformly and independently from $\{I, X, Y, Z\}^{\otimes 2}\backslash\{I[I\}$.
3. With probability $$\frac{2p}{3},$$

the preparation of the $|0\rangle$ state can be replaced by $|1\rangle=X|0\rangle$. Similarly, with probability $$\frac{2p}{3},$$

the preparation of the $|+\rangle$ state can be replaced by $|-\rangle=Z|+\rangle$.

4. With probability $$\frac{2p}{3},$$

any single qubit measurement can have its outcome flipped.

5. With probability p, each idle gate location can be followed by a Pauli error drawn uniformly and independently from $\{X, Y, Z\}$.

Let $P_E$ be the probability for a given edge E to be highlighted during a MWPM. $P_E$ can be computed by the decoding component 1002 by summing the probabilities of all error configurations (e.g., using the noise model described above) resulting in the edge E being highlighted. The weight for the edge E can be characterized as $W_E=-\log P_E$. Further, let $S=\langle g_1, g_2, \ldots, g_r\rangle$ be the generating set for the stabilizer group S of the color code. Moreover, let $n_{g_i}=1$ if the flag qubit configuration in FIGS. 9A and/or 9B flags during the measurement of $g_i$, and $n_{g_i}=0$ otherwise. Wherein, m>0 stabilizers are flagged (e.g., $m=\Sigma_{g_i\in S} n_{g_i}$ with at least one $n_{g_i}$ being non-zero). One or more other errors arising from faults that don't cause any flags can occur with probability $O(p^{m+1})$ where $l\geq 1$. For example, edges e in the matching graphs that cannot contain errors resulting from the set of m flags (e.g., with error probabilities $P_e$) can be renormalized by $P_e'=p^m P_e$, whereas edges $e_f$ that could contain errors resulting from the flags can have edge weight $w_{e_f}=-\log P_{e_f}$ with error $P_{e_f}=O(p)$, which can be computed by the decoding component 1002 by considering the single faults leading to the particular flag outcome. Further, the full distance of the considered codes can be preserved (e.g., any error arising from at most $[(d-1)/2]$ can be corrected.

Since a flag edge $e_{f_i}$ can be used when there are flags, the weight of the flag edge can be set to infinity unless the flag qubits associated with the edge $e_{f_i}$ are flagged. Further, a single fault resulting in flags can also introduce weight-one data qubit errors.

Figure 12A:
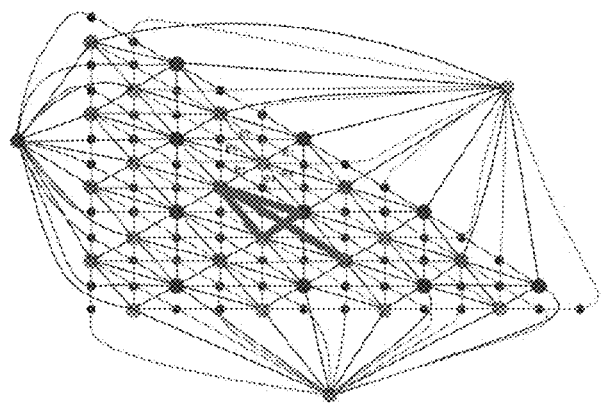
FIG. 12A illustrates a diagram of an example, non-limiting flag scheme that can facilitate decoding one or more encoded trivalent lattices that characterize a quantum circuit in accordance with one or more embodiments described herein.
Figure 12B:
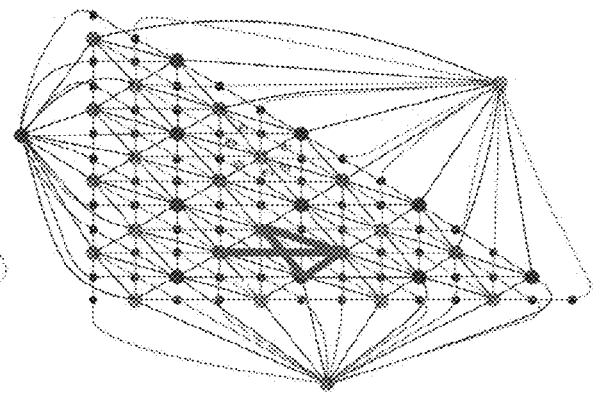
FIG. 12B illustrates a diagram of an example, non-limiting flag scheme that can facilitate decoding one or more encoded trivalent lattices that characterize a quantum circuit in accordance with one or more embodiments described herein.
Figure 12C:
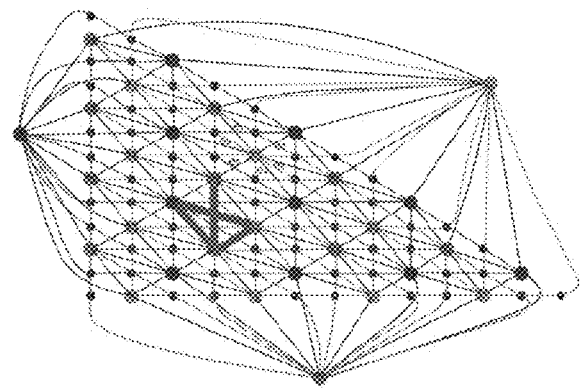
FIG. 12C illustrates a diagram of an example, non-limiting flag scheme that can facilitate decoding one or more encoded trivalent lattices that characterize a quantum circuit in accordance with one or more embodiments described herein.

FIGS. 12A, 12B, and/or 12C illustrate example, non-limiting flag schemes that can be performed by the decoding component 1002 in accordance with one or more embodiments described herein. Repetitive description of like elements employed in other embodiments described herein is omitted for sake of brevity. FIG. 12A can depict flag edge and 2D edges (e.g., on a color coded, encoded trivalent lattice) associated with a first flag outcome. FIG. 12B can depict flag edge and 2D edges (e.g., on a color coded, encoded trivalent lattice) associated with a second flag outcome. FIG. 12C can depict flag edge and 2D edges (e.g., on a color coded, encoded trivalent lattice) associated with a third flag outcome.

As shown in FIGS. 12A, 12B, and/or 12C, flag edges and edges associated with single qubit errors having weights can be renormalized to $$w_{e_{f_i}} = -\log P_{e_{f_i}}$$

with error $$P_{e_{f_i}} = O(p)$$

for the possible flag outcomes of FIGS. 9A and/or 9B. In FIGS. 12A, 12B, and/or 12C, the decoding component 1002 considered green flag edges centered around a red ancilla qubit vertex. However, the same pattern of flag edges can be chosen for blue flag edges centered around a green ancilla qubit vertex, and/or red flag edges centered around a blue ancilla qubit vertex.

Thereby, in one or more embodiments $m=\Sigma_{g_i\in S} n_{g_i}$ flags during one or more stabilizer measurements with m>0. Further, $C_f$ can be the set of edges associated with the flag outcomes, in addition to the 2D edges associated with the possible single-qubit errors arising from faults resulting in the flags. Thus, the edge weights for the edges $e_i\in C_f$ can be renormalized to $w_{e_j}=-\log P_{e_j}'$ with $P_{e_j}'=p^m P_{e_j}$. If $e_j\notin C_f$ is a flag edge, then its weight can be infinite.

Additionally, in one or more embodiments the decoding component 1002 can perform a direct flag scheme in addition to, or alternate to, renormalizing the edge weights of the matching graphs based on the flag measurement outcomes. For example, with regards to the exemplary first stabilizer measurement circuit 302, consider a case in which only the first flag qubit $f_1$ flags during the weight-six Z stabilizer measurement. Wherein there is at most one fault, the possible data qubit errors (e.g., determined by the outcome component 802, as depicted in FIG. 9A) can be $\{I, Z_1, Z_1 Z_2\}$. Consequently, if the decoding component 1002 applies the correction $Z_1$ to the data following the when the flag outcome is known, the weight of any remaining data qubit error can be at most one. Similarly, the decoding component 1002 can apply: the correction $Z_4$ for a flag outcome of the second flag qubit, the correction $Z_6$ for a flag outcome of the third flag qubit, and/or the correction for $Z_3 Z_4$ for a flag outcome of the first and third flag qubit. Additionally, if a different flag outcome is obtained, the decoding component 1002 can apply no correction to the data. In each ease, the remaining data qubit errors arising from a single fault during the measurement of the stabilizer can be at most one. Also, the decoding component 1002 can apply the flag scheme when measuring X stabilizers, but replacing the Z corrections with X Pauli's, supported on the same qubits. Further, the decoding component 1002 can define similar rules for the weight-four stabilizer measurements.

By applying the direct flag scheme, a single fault occurring during a stabilizer measurement can result in a data qubit error of weight that is equal to or less than one. However, more flag qubits can be required for each stabilizer measurement, as compared to the edge weight renormalization flag schemes (e.g., depicted in FIGS. 11-12C). For instance, wherein a single flag qubit is used for a weight-four Z-type stabilizer, if a single fault resulted in a flag, the possible Z-type data qubits errors can be $\equiv_5 Z_1, Z_3, Z_1 Z_2, Z_3 Z_4$. Since there is a single flag qubit, the decoding component 1002 could lack information to determine whether to apply a $Z_1$ or $Z_3$ correction to the data. However, the decoding component 1002 can utilize one or more embodiments of the flag scheme depicted in FIGS. 11-12C and renormalize the edge weights for edges corresponding to data qubits errors $Z_1$, $Z_3$, and/or $Z_1Z_2$. Thereby, in accordance with the various embodiments described herein, the decoding component 1002 can preserve the effective code distance of the color code.

Additionally, with the direct flag scheme, the decoding component 1002 can apply the same operations to the data regardless of the noise model. Wherein measurement errors occur with high probability, the direct flag scheme can apply weight-one corrections to the data more often than other flag scheme embodiments described herein. For example, the one or more renormalization flag schemes described herein can incorporate the higher measurement error probability into the assignment of edge weights.

Figure 13A:
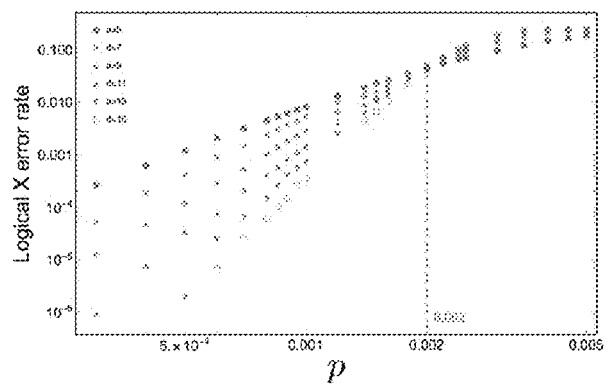
FIG. 13A illustrates a diagram of an example, non-limiting plot graph that can depict logical X error rates for a color coded encoded trivalent lattice afflicted by a depolarizing noise model in accordance with one or more embodiments described herein.
Figure 13B:
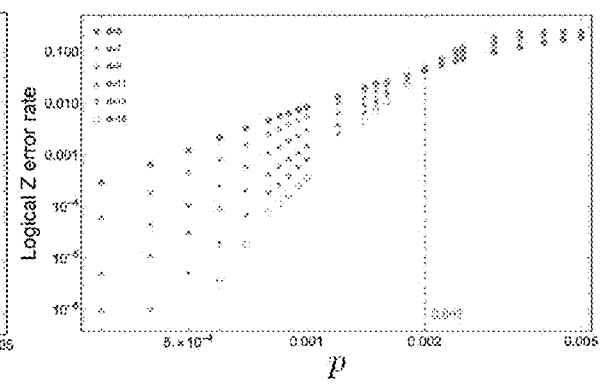
FIG. 13B illustrates a diagram of an example, non-limiting plot graph that can depict logical Z error rates for a color coded encoded trivalent lattice afflicted by a depolarizing noise model in accordance with one or more embodiments described herein.

FIGS. 13A and/or 13B can illustrate diagram of example, non-limiting logical X error rates and/or logical Z error rates for a color coded encoded trivalent lattice (e.g., encoded via graph component 108) afflicted by the noise model described above in accordance with one or more embodiments described herein. Repetitive description of like elements employed in other embodiments described herein is omitted for sake of brevity. FIGS. 13A and/or 13B can comprise plots illustrating the logical failure rates for code capacity noise and/or the full circuit level depolarizing noise model described herein (e.g., characterized by observations 1-5).

Regarding code capacity noise, each data qubit can be afflicted by X, Y, or Z errors, each occurring with probability p/3. Measurements, state preparation and/or gates can be assumed to be implemented optimally. Thresholds for code capacity noise can illustrate the theoretical limitations of a code and the decoding algorithm used to correct errors. As shown in FIGS. 13A and/or 13B, the logical X and/or Z error rates for the hexagonal color code afflicted by the depolarizing noise model described herein along with one or more of the flag schemes to renormalize edge weights in accordance with one or more embodiments. FIGS. 13A and/or 13B depict an exemplary threshold for both X and/or Z logical failure rates occurring at $p_{th}$=0.002.

For a given syndrome measurement cycle, the X-stabilizers can be measured first followed by the Z-stabilizers. Supposing that during the j'th syndrome measurement cycle, a subset of flag qubits fagged, for example, during the X-stabilizer measurements. Flag edges within finite weights can be introduced in the j'th 2D layer of the 3D matching graph used for the X-stabilizer measurement outcomes. However, for flag qubits which flag during the Z-stabilizer measurements, Z errors resulting from faults which led to the non-trivial flag measurements can be detected, for example, during the j+1'th syndrome measurement cycle. In such a case, flag edges with finite weight can be introduced in the j+1'th 2D layer of the 3D matching graph used for Z-stabilizer measurement outcomes.

Figure 14A:
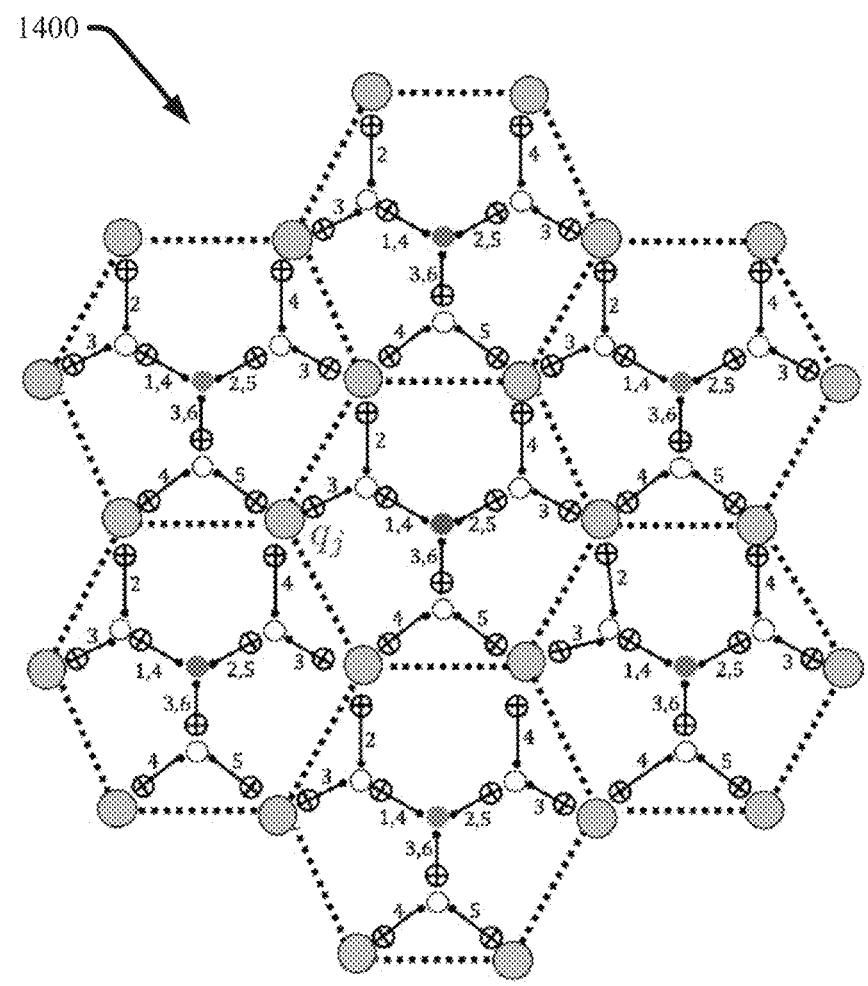
FIG. 14A illustrates a diagram of an example, non-limiting a trivalent lattice that can map one or more ancilla qubits, flag qubits, and/or data qubits and incorporate a scheduling scheme based on a connectivity scheme of a quantum circuit in accordance with one or more embodiments described herein.

FIG. 14A illustrates a diagram of an example, non-limiting second scheduling scheme 1400 that can be encoded to a trivalent lattice in accordance with one or more embodiments described herein. Repetitive description of like elements employed in other embodiments described herein is omitted for sake of brevity. As shown in FIG. 14A, the ancilla qubits encoded to the trivalent lattice of the second scheduling scheme 1400 can be color coded in accordance with various embodiments described herein. For example, the ancilla vertexes can be color coded red, green, and/or blue. FIG. 14A shows the connections between a red ancilla vertex with blue and green vertices as could occur in the bulk of a hexagonal color code on the trivalent lattice.

Figure 14B:
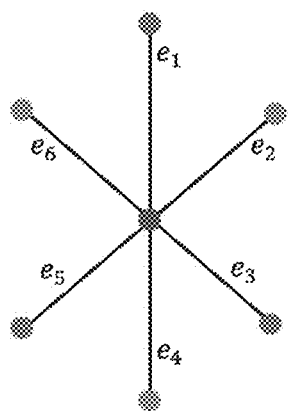
FIG. 14B illustrates a diagram of example, non-limiting edges that can be derived from a trivalent lattice that can map one or more ancilla qubits, flag qubits, and/or data qubits and incorporate a scheduling scheme based on a connectivity scheme of a quantum circuit in accordance with one or more embodiments described herein.

FIG. 14B illustrates a diagram of example non-limiting edges (e.g., represented by "$e_1$", "$e_2$", "$e_3$", "$a_4$", "$e_5$", and/or "$e_6$") that can characterize the connections between the red vertex shown in FIG. 14A and the blue and green vertices shown in FIG. 14A, which can be represented in an RGB matching graph (e.g., such as the trivalent lattices depicted in FIGS. 11-12C) in accordance with one or more embodiments described herein. Repetitive description of like elements employed in other embodiments described herein is omitted for sake of brevity.

In addition to the 2D edges of the color coded, encoded trivalent lattice, along with three-dimensional vertical edges connecting a vertex of the same color in two different time steps to deal with measurement errors, the decoding component 1002 can also correlate errors in both space and time arising from CNOT gate failures. For example, FIG. 14A can depict the connectivity between a red ancilla vertex in the bulk, with blue and green vertices. Also, in FIG. 14B the edges representing the connections between the red vertex with the green and blue vertices can be labeled as could be presented in the full RGB matching graph.

To further exemplify the various embodiments described herein, consider the CNOT gates connecting the red and green vertices to the data qubits vertices (e.g., represented by yellow circles) along the edge $e_5$. In particular, the CNOT gates between the flag qubit vertices (e.g., represented by white circles) and the data qubit vertices. Let $C_t^l$ correspond to a CNOT gate belonging to a face with a vertex of color "l", applied at the time step "t" for a given cycle of syndrome measurements. Wherein, for example, during the $t_j$'th syndrome measurement cycle, the CNOT $C_4^G$ fails and introduces an error from the set {ZZ, ZY, YZ, YY}. Propagating the errors through a stabilizer measurement circuit (e.g., first stabilizer measurement circuit 302), can show that such a fault can introduce a Z error on the data qubit $q_j$, as shown in FIG. 14A. However, given the time step at which the error occurs (e.g., the fourth time step), the green ancilla vertex can be highlighted. If a Z error on the data qubit $q_j$ had instead occurred during the first time step of the syndrome measurement cycle $t_j$, then both the green and red ancillas could have been highlighted (e.g., assuming no other errors were introduced). During the next syndrome measurement cycle $t_{j+1}$, both red and green ancilla could be highlighted. Similarly, if the CNOT gate $C_3^R$ failed and/or introduced an error from the set {IZ, XZ, IY, XY}, the same pattern in highlighted ancillas can be observed.

Figure 15:
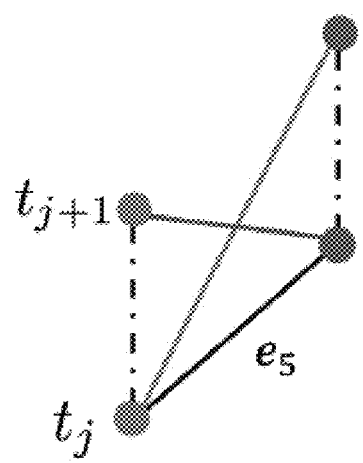
FIG. 15 illustrates a diagram of example, non-limiting diagonal edges that can be derived from a trivalent lattice that can map one or more ancilla qubits, flag qubits, and/or data qubits and incorporate a scheduling scheme based on a connectivity scheme of a quantum circuit in accordance with one or more embodiments described herein.

FIG. 15 illustrates a diagram of example, non-limiting diagonal edges that can be implemented by the decoding component 1002 within one or more flag schemes with respect to the connectivity depicted in FIGS. 14A and/or 14B in accordance with one or more embodiments described herein. Repetitive description of like elements employed in other embodiments described herein is omitted for sake of brevity.

Wherein both red and green ancillas are highlighted in the same syndrome measurement cycle (e.g., during the cycle $t_j$, caused by a Z data qubit error on qubit $q_j$ at the first time step), the edge $e_5$ can be chosen by the decoding component 1002 when performing the MWPM on the red-green ("RG") subgraph. However, since the red vertex can be highlighted during the cycle $t_{j+1}$, whereas the green vertex can be highlighted in cycles $t_j$ and $t_{j+1}$, the decoding component 1002 can add the green edges depicted in FIG. 15. At least because the decoding component 1002 can consider (e.g., via the MWPM) changes in measurement outcomes of a given vertex between consecutive cycles, the green vertex can be highlighted in cycle $t_3$ with the red vertex highlighted, for example, in cycle $t_{j+1}$. Thus, the shortest path connecting both vertices can be obtained by choosing the green edge depicted in FIG. 15. Wherein the green edge depicted in FIG. 15 is chosen during the MWPM, the decoding component 1002 can project the green edge onto the edge $e_5$ when performing the vertical collapse from a 3D RG graph to a 2D graph. Also, the red edge depicted in FIG. 15 can be chosen if the CNOT gate $C_3^G$ failed and/or introduced an error from the set {IZ, XZ, IY, XY}, or the CNOT gate $C_4^G$ failed and/or introduced errors from the set {ZZ, ZY, YZ, YY}. 3D edges such as the edges depicted in FIG. 15 can be referred to as 3D diagonal edges at least due to errors arising from CNOT gates resulting in different highlighted vertices between two consecutive syndrome measurement cycles. Thereby, the faults can result in highlighted edges between vertices belonging to different locations in the 2D red-green-blue ("RGB") matching graph (e.g., after performing the vertical collapse from the 3D matching graph to the 2D graph). Measurement errors can result in 3D vertical edges connecting the same vertex in two different syndrome measurement cycles.

FIGS. 16A, 16B, and/or 16B illustrate diagrams of example, non-limiting 3D diagonal edges mapped to a trivalent lattice and/or connecting two different 2D graphs for a color coded subgraph in accordance with one or more embodiments described herein. Repetitive description of like elements employed in other embodiments described herein is omitted for sake of brevity. A set of 3D diagonal edges associated with the red-green ("RG") subgraph can be depicted in FIG. 16A. A set of 3D diagonal edges associated with the red-blue ("RB") subgraph can be depicted in FIG. 16B. Also, a set of 3D diagonal edges associated with the green-blue ("GB") subgraphs can be depicted in FIG. 16C. For example, the diagonal edges depicted in FIGS. 16A, 16B, and/or 16C can be obtained by the decoding component 1002 by performing a similar analysis to the one performed above leading to the edges shown in FIG. 15. For instance, the diagonal edges depicted in FIGS. 16A, 16B, and/or 16C can be obtained considering the single fault events arising from CNOT failures leading to edges which can be projected on the 2D edges $e_1$ to $e_6$ shown in FIG. 14B. In addition, FIGS. 16A, 16B, and/or 16C can consider the CNOT scheduling at all boundary locations of the trivalent lattice.

With regards to the edge weight for the green edge depicted in FIG. 15; from the depolarizing noise model described herein, each two-qubit Pauli operator can occur with probability p/15. A green edge can occur if the CNOT gate $C_4^G$ fails and/or introduces an error from the set {ZZ, ZY, YZ, YY} (e.g., having a total probability of 4p/15) and/or no failure occurs for CNOT gate $C_3^R$. Alternatively, a green edge can occur if $C_3^R$ fails and/or introduces an error from the set {IZ, XZ, IY, XY} and no failure occurs for $C_4^G$. Summing the probabilities for both cases, the total probability of obtaining a green highlighted edge in FIG. 15 can be characterized by Equation 1 below.

$$p_E = \frac{8p}{15}\left(1 - \frac{4p}{15}\right) \quad (1)$$

Thereby, the edge weight can be characterized by $W_E = -\log p_E$.

FIG. 17 illustrates a flow diagram of an example, non-limiting computer-implemented method 1700 that can facilitate encoding one or more quantum circuits to a trivalent lattice in accordance with one or more embodiments described herein. Repetitive description of like elements employed in other embodiments described herein is omitted for sake of brevity.

At 1702, the computer-implemented method 1700 can comprise encoding (e.g., via graph component 108), by a system 100 operatively coupled to a processor 118, a plurality of data qubits to a trivalent lattice for a measurement of a Pauli matrix stabilizer based on a connectivity scheme of a quantum circuit, wherein the measurement can be selected from the group consisting of a weight-six measurement of the Pauli matrix stabilizer and a weight-four measurement of the Pauli matrix stabilizer. For example, the encoding at 1702 can comprise implementing (e.g., via first stabilizer component 110 and/or second stabilizer component 402) one or more hexagonal and/or trapezoidal geometries onto the trivalent lattice in accordance with the various embodiments described herein, wherein each hexagon and/or trapezoid region formed by the geometries can characterize a Z stabilizer or X stabilizer measurement (e.g., as depicted in FIGS. 2, 3A, 3B, 5A and/or 5B).

At 1704, the computer-implemented method 1700 can comprise determining (e.g., via outcome component 802), by the system 100, a flag qubit outcome corresponding to a data qubit error configuration based on the connectivity scheme of the quantum circuit encoded to the trivalent lattice that can map an ancilla qubit to the plurality of data qubits via a flag qubit. For example, the determining at 1704 can comprise identifying one or more data qubit error correlations, as exemplified in FIGS. 9A and/or 9B.

FIG. 18 illustrates a flow diagram of an example, non-limiting computer-implemented method 1800 that can facilitate encoding one or more quantum circuits to a trivalent lattice in accordance with one or more embodiments described herein. Repetitive description of like elements employed in other embodiments described herein is omitted for sake of brevity.

At 1802, the computer-implemented method 1800 can comprise encoding (e.g., via graph component 108), by a system 100 operatively coupled to a processor 118, a quantum circuit to a trivalent lattice that can map an ancilla qubit to a plurality of data qubits via a plurality of flag qubits based on a connectivity scheme of the quantum circuit. At 1804, the computer-implemented method 1800 can comprise identifying (e.g., via outcome component 802), by the system 100, a flag qubit outcome with corresponding error configurations associated with the plurality of data qubits based on an association between the plurality of data qubits and the plurality of flag qubits on the trivalent lattice. At 1806, the computer-implemented method 1800 can comprise decoding (e.g., via decoding component 1002), by the system 100, the trivalent lattice using an edge of the trivalent lattice that extends between two ancilla qubits during a MEPM process of a decoding algorithm.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 19:
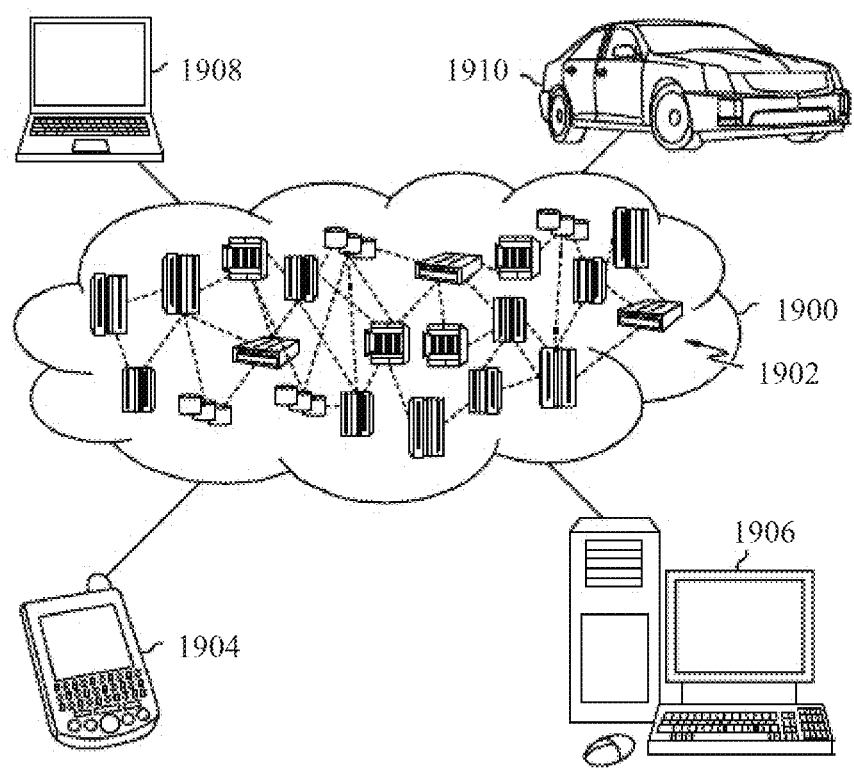
FIG. 19 depicts a cloud computing environment in accordance with one or more embodiments described herein.

Referring now to FIG. 19, illustrative cloud computing environment 1900 is depicted. As shown, cloud computing environment 1900 includes one or more cloud computing nodes 1902 with which local computing devices used by cloud consumers, such as, for example, personal digital assistant (PDA) or cellular telephone 1904, desktop computer 1906, laptop computer 1908, and/or automobile computer system 1910 may communicate. Nodes 1902 may communicate with one another. They may be grouped (not shown) physically or virtually, in one or more networks, such as Private, Community, Public, or Hybrid clouds as described hereinabove, or a combination thereof. This allows cloud computing environment 1900 to offer infrastructure, platforms and/or software as services for which a cloud consumer does not need to maintain resources on a local computing device. It is understood that the types of computing devices 1904-1910 shown in FIG. 19 are intended to be illustrative only and that computing nodes 1902 and cloud computing environment 1900 can communicate with any type of computerized device over any type of network and/or network addressable connection (e.g., using a web browser).

Figure 20:
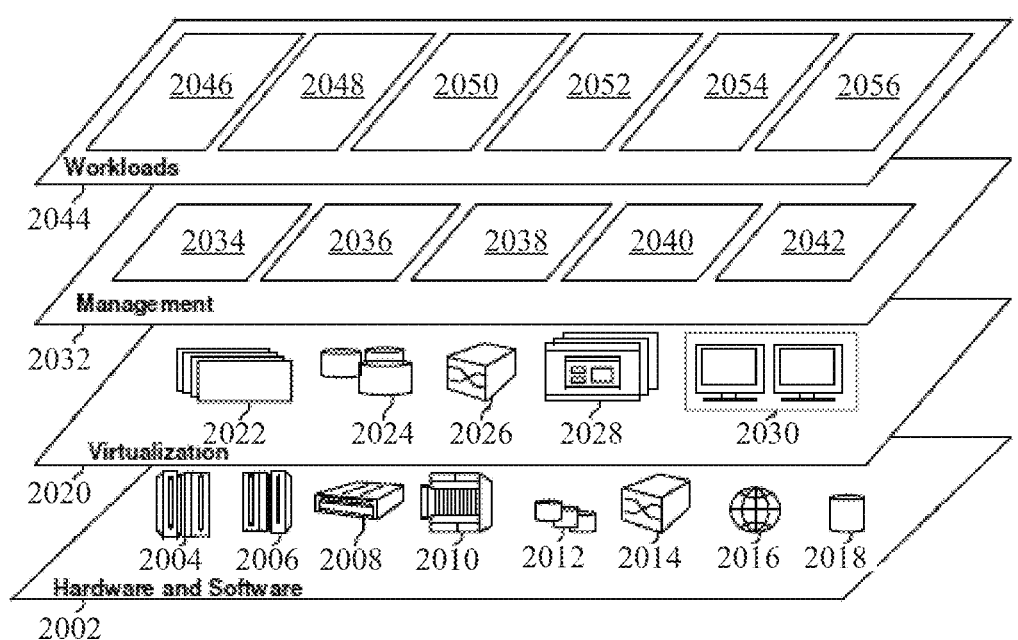
FIG. 20 depicts abstraction model layers in accordance with one or more embodiments described herein.

Referring now to FIG. 20, a set of functional abstraction layers provided by cloud computing environment 1900 (FIG. 19) is shown. Repetitive description of like elements employed in other embodiments described herein is omitted for sake of brevity. It should be understood in advance that the components, layers, and functions shown in FIG. 20 are intended to be illustrative only and embodiments of the invention are not limited thereto. As depicted, the following layers and corresponding functions are provided.

Hardware and software layer 2002 includes hardware and software components. Examples of hardware components include: mainframes 2004; RISC (Reduced Instruction Set Computer) architecture based servers 2006; servers 2008; blade servers 2010; storage devices 2012; and networks and networking components 2014. In some embodiments, software components include network application server software 2016 and database software 2018.

Virtualization layer 2020 provides an abstraction layer from which the following examples of virtual entities may be provided: virtual servers 2022; virtual storage 2024; virtual networks 2026, including virtual private networks; virtual applications and operating systems 2028; and virtual clients 2030.

In one example, management layer 2032 may provide the functions described below. Resource provisioning 2034 provides dynamic procurement of computing resources and other resources that are utilized to perform tasks within the cloud computing environment. Metering and Pricing 2036 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2038 provides access to the cloud computing environment for consumers and system administrators. Service level management 2040 provides cloud computing resource allocation and management such that required service levels are met. Service Level Agreement (SLA) planning and fulfillment 2042 provide pre-arrangement for, and procurement of, cloud computing resources for which a future requirement is anticipated in accordance with an SLA.

Workloads layer 2044 provides examples of functionality for which the cloud computing environment may be utilized. Examples of workloads and functions which may be provided from this layer include: mapping and navigation 2046; software development and lifecycle management 2048; virtual classroom education delivery 2050; data analytics processing 2052; transaction processing 2054; and quantum circuit encoding 2056. Various embodiments of the present invention can utilize the cloud computing environment described with reference to FIGS. 19 and 20 to encode a quantum circuit to a trivalent lattice in accordance with one or more embodiments described herein.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 21:
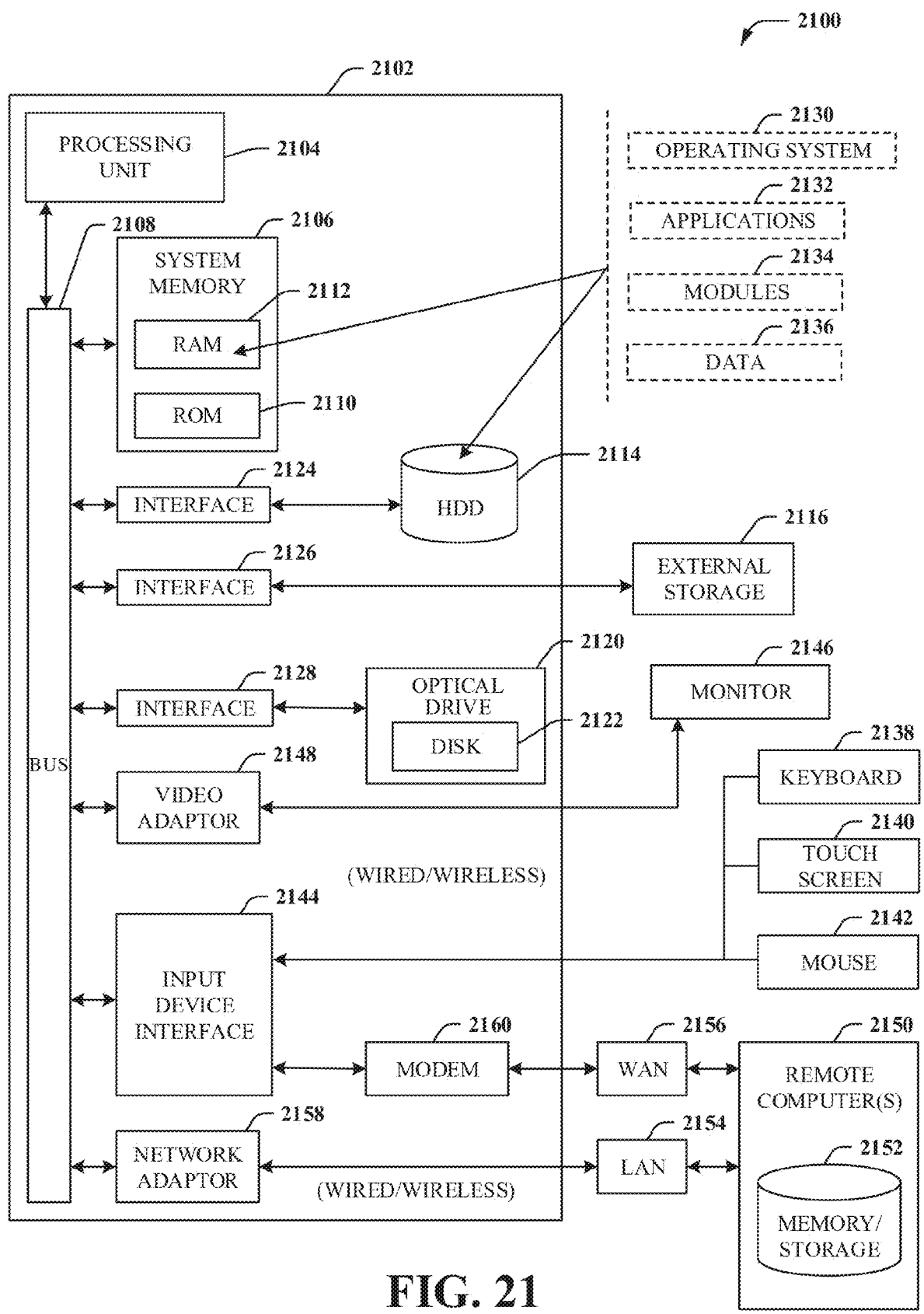
FIG. 21 illustrates a block diagram of an example, non-limiting operating environment in which one or more embodiments described herein can be facilitated.

In order to provide additional context for various embodiments described herein, FIG. 21 and the following discussion are intended to provide a general description of a suitable computing environment 2100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things ("IoT") devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 21, the example environment 2100 for implementing various embodiments of the aspects described herein includes a computer 2102, the computer 2102 including a processing unit 2104, a system memory 2106 and a system bus 2108. The system bus 2108 couples system components including, but not limited to, the system memory 2106 to the processing unit 2104. The processing unit 2104 can be any of various commercially available processors. Dual microprocessors and other multi-processor architectures can also be employed as the processing unit 2104.

The system bus 2108 can be any of several types of bus structure that can further interconnect to a memory bus (with or without a memory controller), a peripheral bus, and a local bus using any of a variety of commercially available bus architectures. The system memory 2106 includes ROM 2110 and RAM 2112. A basic input/output system ("BIOS") can be stored in a non-volatile memory such as ROM, erasable programmable read only memory ("EPROM"), EEPROM, which BIOS contains the basic routines that help to transfer information between elements within the computer 2102, such as during startup. The RAM 2112 can also include a high-speed RAM such as static RAM for caching data.

The computer 2102 further includes an internal hard disk drive ("HDD") 2114 (e.g., EIDE, SATA), one or more external storage devices 2116 (e.g., a magnetic floppy disk drive ("FDD") 2116, a memory stick or flash drive reader, a memory card reader, etc.) and an optical disk drive 2120 (e.g., which can read or write from a CD-ROM disc, a DVD, a BD, etc.). While the internal HDD 2114 is illustrated as located within the computer 2102, the internal HDD 2114 can also be configured for external use in a suitable chassis (not shown). Additionally, while not shown in environment 2100, a solid state drive ("SSD") could be used in addition to, or in place of, an HDD 2114. The HDD 2114, external storage device(s) 2116 and optical disk drive 2120 can be connected to the system bus 2108 by an HDD interface 2124, an external storage interface 2126 and an optical drive interface 2128, respectively. The interface 2124 for external drive implementations can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 2102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2112, including an operating system 2130, one or more application programs 2132, other program modules 2134 and program data 2136. All or portions of the operating system, applications, modules, and/or data can also be cached in the RAM 2112. The systems and methods described herein can be implemented utilizing various commercially available operating systems or combinations of operating systems.

Computer 2102 can optionally comprise emulation technologies. For example, a hypervisor (not shown) or other intermediary can emulate a hardware environment for operating system 2130, and the emulated hardware can optionally be different from the hardware illustrated in FIG. 21. In such an embodiment, operating system 2130 can comprise one virtual machine ("VM") of multiple VMs hosted at computer 2102. Furthermore, operating system 2130 can provide runtime environments, such as the Java runtime environment or the .NET framework, for applications 2132. Runtime environments are consistent execution environments that allow applications 2132 to run on any operating system that includes the runtime environment. Similarly, operating system 2130 can support containers, and applications 2132 can be in the form of containers, which are lightweight, standalone, executable packages of software that include, e.g., code, runtime, system tools, system libraries and settings for an application.

Further, computer 2102 can be enable with a security module, such as a trusted processing module ("TPM"). For instance with a TPM, boot components hash next in time boot components, and wait for a match of results to secured values, before loading a next boot component. This process can take place at any layer in the code execution stack of computer 2102, e.g., applied at the application execution level or at the operating system ("OS") kernel level, thereby enabling security at any level of code execution.

A user can enter commands and information into the computer 2102 through one or more wired/wireless input devices, e.g., a keyboard 2138, a touch screen 2140, and a pointing device, such as a mouse 2142. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2104 through an input device interface 2144 that can be coupled to the system bus 2108, but can be connected by other interfaces, such as a parallel port, an IEEE 1394 serial port, a game port, a USB port, an IR interface, a BLUETOOTH® interface, etc.

A monitor 2146 or other type of display device can be also connected to the system bus 2108 via an interface, such as a video adapter 2148. In addition to the monitor 2146, a computer typically includes other peripheral output devices (not shown), such as speakers, printers, etc.

The computer 2102 can operate in a networked environment using logical connections via wired and/or wireless communications to one or more remote computers, such as a remote computer(s) 2150. The remote computer(s) 2150 can be a workstation, a server computer, a router, a personal computer, portable computer, microprocessor-based entertainment appliance, a peer device or other common network node, and typically includes many or all of the elements described relative to the computer 2102, although, for purposes of brevity, only a memory/storage device 2152 is illustrated. The logical connections depicted include wired/wireless connectivity to a local area network ("LAN") 2154 and/or larger networks, e.g., a wide area network ("WAN") 2156. Such LAN and WAN networking environments are commonplace in offices and companies, and facilitate enterprise-wide computer networks, such as intranets, all of which can connect to a global communications network, e.g., the Internet.

When used in a LAN networking environment, the computer 2102 can be connected to the local network 2154 through a wired and/or wireless communication network interface or adapter 2158. The adapter 2158 can facilitate wired or wireless communication to the LAN 2154, which can also include a wireless access point ("AP") disposed thereon for communicating with the adapter 2158 in a wireless mode.

When used in a WAN networking environment, the computer 2102 can include a modem 2160 or can be connected to a communications server on the WAN 2156 via other means for establishing communications over the WAN 2156, such as by way of the Internet. The modem 2160, which can be internal or external and a wired or wireless device, can be connected to the system bus 2108 via the input device interface 2144. In a networked environment, program modules depicted relative to the computer 2102 or portions thereof, can be stored in the remote memory/storage device 2152. It will be appreciated that the network connections shown are example and other means of establishing a communications link between the computers can be used.

When used in either a LAN or WAN networking environment, the computer 2102 can access cloud storage systems or other network-based storage systems in addition to, or in place of, external storage devices 2116 as described above. Generally, a connection between the computer 2102 and a cloud storage system can be established over a LAN 2154 or WAN 2156 e.g., by the adapter 2158 or modem 2160, respectively. Upon connecting the computer 2102 to an associated cloud storage system, the external storage interface 2126 can, with the aid of the adapter 2158 and/or modem 2160, manage storage provided by the cloud storage system as it would other types of external storage. For instance, the external storage interface 2126 can be configured to provide access to cloud storage sources as if those sources were physically connected to the computer 2102.

The computer 2102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A system, comprising:
    a memory that stores computer executable components; and
    a processor, operably coupled to the memory, and that executes the computer executable components stored in the memory, wherein the computer executable components comprise:
        a graph component that encodes a quantum circuit to a trivalent lattice that maps an ancilla qubit to a plurality of data qubits via a plurality of flag qubits based on a connectivity scheme of the quantum circuit.

2. The system of claim 1, wherein the quantum circuit comprises a stabilizer measurement circuit, and wherein the system further comprises:
    a first stabilizer component that encodes the plurality of data qubits to the trivalent lattice for a weight-six measurement of a Pauli matrix stabilizer based on the connectivity scheme of the quantum circuit.

3. The system of claim 1, wherein the quantum circuit comprises a stabilizer measurement circuit, and where the system further comprises:
    a first stabilizer component that encodes the plurality of data qubits to the trivalent lattice for a weight-four measurement of a Pauli matrix stabilizer based on the connectivity scheme of the quantum circuit.

4. The system of claim 1, wherein the trivalent lattice is characterized by a geometry comprising at least one member selected from the group consisting of a hexagonal geometry and a trapezoidal geometry, wherein the plurality of data qubits define corners of the geometry, and wherein the ancilla qubit and the plurality of flag qubits are positioned on the trivalent lattice within the geometry.

5. The system of claim 1, further comprising:
    an outcome component that identifies a flag qubit outcome with corresponding error configurations associated with the plurality of data qubits based on an association between the plurality of data qubits and the plurality of flag qubits on the trivalent lattice.

6. The system of claim 1, further comprising:
    a decoding component that utilizes an edge of the trivalent lattice that extends between the ancilla qubit and a second ancilla qubit during a minimum-weight perfect matching process of an algorithm to decode the trivalent lattice.

7. A system, comprising:
    a memory that stores computer executable components; and
    a processor, operably coupled to the memory, and that executes the computer executable components stored in the memory, wherein the computer executable components comprise:
        an outcome component that determines a flag qubit outcome corresponding to a data qubit error configuration based on a connectivity scheme of a quantum circuit encoded to a trivalent lattice that maps an ancilla qubit to a plurality of data qubits via a flag qubit.

8. The system of claim 7, wherein the outcome component determines the data qubit error configuration based on an association between the plurality of data qubits and the flag qubit on the trivalent lattice.

9. The system of claim 7, wherein the quantum circuit comprises a stabilizer measurement circuit, and wherein the system further comprises:
    a first stabilizer component that encodes the plurality of data qubits to the trivalent lattice for a weight-six measurement of a Pauli matrix stabilizer based on the connectivity scheme of the quantum circuit.

10. The system of claim 7, wherein the quantum circuit comprises a stabilizer measurement circuit, and wherein the system further comprises:
    a first stabilizer component that encodes the plurality of data qubits to the trivalent lattice for a weight-four measurement of a Pauli matrix stabilizer based on the connectivity scheme of the quantum circuit.

11. The system of claim 7, wherein the trivalent lattice is characterized by a geometry comprising at least one member selected from the group consisting of a hexagonal geometry and a trapezoidal geometry, wherein the plurality of data qubits define corners of the geometry, and wherein the ancilla qubit and the flag qubit are positioned on the trivalent lattice within the geometry.

12. A computer-implemented method, comprising:
    encoding, by a system operatively coupled to a processor, a quantum circuit to a trivalent lattice that maps an ancilla qubit to a plurality of data qubits via a plurality of flag qubits based on a connectivity scheme of the quantum circuit.

13. The computer-implemented method of claim 12, further comprising:
    encoding, by the system, the plurality of data qubits to the trivalent lattice for a measurement of a Pauli matrix stabilizer based on the connectivity scheme of the quantum circuit, wherein the measurement is selected from the group consisting of a weight-six measurement of the Pauli matrix stabilizer and a weight-four measurement of the Pauli matrix stabilizer.

14. The computer-implemented method of claim 12, further comprising:
identifying, by the system, a flag qubit outcome with corresponding error configurations associated with the plurality of data qubits based on an association between the plurality of data qubits and the plurality of flag qubits on the trivalent lattice.

15. The computer-implemented method of claim 12, further comprising:
decoding, by the system, the trivalent lattice using an edge of the trivalent lattice that extends between the ancilla qubit and a second ancilla qubit during a minimum-weight perfect matching process of a decoding algorithm.

16. A computer-implemented method, comprising:
determining, by a system operatively coupled to a processor, a flag qubit outcome corresponding to a data qubit error configuration based on a connectivity scheme of a quantum circuit encoded to a trivalent lattice that maps an ancilla qubit to a plurality of data qubits via a flag qubit.

17. The computer-implemented method of claim 16, further comprising:
encoding, by the system, the plurality of data qubits to the trivalent lattice for measurement of a Pauli matrix stabilizer based on the connectivity scheme of the quantum circuit, wherein the measurement is selected from the group consisting of a weight-six measurement of the Pauli matrix stabilizer and a weight-four measurement of the Pauli matrix stabilizer.

18. The computer-implemented method of claim 16, wherein the trivalent lattice is characterized by a geometry comprising at least one member selected from the group consisting of a hexagonal geometry and a trapezoidal geometry, wherein the plurality of data qubits define corners of the geometry, and wherein the ancilla qubit and the flag qubit are positioned on the trivalent lattice within the geometry.

19. The computer-implemented method of claim 16, wherein the determining the flag qubit outcome is based on an association between the plurality of data qubits and the flag qubit on the trivalent lattice.

20. A computer program product for encoding a connectivity scheme of a quantum circuit, the computer program product comprising a computer readable storage medium having program instructions embodied therewith, the program instructions executable by a processor to cause the processor to:
encode, by the processor, the quantum circuit to a trivalent lattice that maps an ancilla qubit to a plurality of data qubits via a plurality of flag qubits based on the connectivity scheme of the quantum circuit.

21. The computer program product of claim 20, wherein the program instructions further cause the processor to:
encode, by the processor, the plurality of data qubits to the trivalent lattice for measurement of a Pauli matrix stabilizer based on the connectivity scheme of the quantum circuit, wherein the measurement is selected from the group consisting of a weight-six measurement of the Pauli matrix stabilizer and a weight-four measurement of the Pauli matrix stabilizer.

22. The computer program product of claim 20, wherein the program instructions further cause the processor to:
identify, by the processor, a flag qubit outcome with corresponding error configurations associated with the plurality of data qubits based on an association between the plurality of data qubits and the plurality of flag qubits on the trivalent lattice.

23. The computer program product of claim 20, wherein the program instructions further cause the processor to:
decode, by the processor, the trivalent lattice using an edge of the trivalent lattice that extends between the ancilla qubit and a second ancilla qubit during a minimum-weight perfect matching process of a decoding algorithm.

24. The computer program product of claim 23, wherein the processor decodes the trivalent lattice using the decoding algorithm in a cloud computing environment.

25. The computer program product of claim 20, wherein the trivalent lattice is characterized by a geometry comprising at least one member selected from the group consisting of a hexagonal geometry and a trapezoidal geometry, wherein the plurality of data qubits define corners of the geometry, and wherein the ancilla qubit and flag qubit are positioned on the trivalent lattice within the geometry.

* * * * *